Oct. 1, 1968 R. L. SNYDER 3,404,375

COMBINATION RANDOM ACCESS AND MASS STORE MEMORY

Filed April 2, 1964 10 Sheets-Sheet 1

INVENTOR
RICHARD L. SNYDER,
BY
Walter J. Adam
ATTORNEY

COMBINATION RANDOM ACCESS AND MASS STORE MEMORY

Filed April 2, 1964

10 Sheets-Sheet 2

Oct. 1, 1968 R. L. SNYDER 3,404,375

COMBINATION RANDOM ACCESS AND MASS STORE MEMORY

Filed April 2, 1964 10 Sheets-Sheet 3

3,404,375

COMBINATION RANDOM ACCESS AND MASS STORE MEMORY

Richard L. Snyder, Fullerton, Calif., assignor to Hughes Aircraft Company, Culver City, Calif., a corporation of Delaware Filed Apr. 2, 1964, Ser. No. 356,706
9 Claims. (Cl. 340—172.5)

ABSTRACT OF THE DISCLOSURE

A random access magnetic shift register system including a plurality of storage banks, each having a magnetic medium for each bit position of a word to be handled and each controlled by a single polyphase propagating array. A magnetic medium is also provided in each bank for storing word addresses. Binary words and addresses are stored as series of magnetic domains along the mediums movable in response to propagating fields. Read-write conductors are provided at both ends of the mediums for reading and writing binary informational domains being propagated in a selected direction therethrough. In one mode of operation, a bank is selected and a control arrangement reads the address and positions the addressed word for reading. In another mode of operation the words are read from a selected bank without considering the word addresses.

This invention relates to data storage systems and particularly to an improved high speed memory system that provides both access to large amounts of binary information and random access to specific portions of the stored information.

Conventional systems for storing a large amount of binary information include magnetic drum memories, disc memories and tape systems both of which have the disadvantage of utilizing mechanical movements. These types of memories although allowing large amounts of information to be serially read therefrom, do not allow random access of specific information without unreasonable time delays, thus requiring large buffer memories and other relatively complex input and output equipment. In a system utilizing a standard core memory, a relatively small amount of information is immediately available for reading, that is, may be randomly accessed, but overall storage capacity is limited by both size and cost factors. Also in a core memory, a separate address is required to interrogate each word in a record or subroutine. In conventional computer systems, large programs are generally transferred as blocks of data to the relatively small main core memory which operations are time consuming, require complex buffering and coupling systems and impose restrictions on the programming of problems to be solved. A memory system that would allow storage of large masses of binary information as well as allow specific information to be addressed and read therefrom in a relatively short time would be highly desirable. It would be even more desirable if this memory system did not require any mechanical motion for its operation such as having memory elements utilizing the principle of shifting discrete magnetic regions along a magnetic medium with the magnetic regions having polarity relations representative of binary information.

It is therefore an object of this invention to provide a memory system in which very large amounts of binary information may be stored so as to be available for access in a relatively short time.

It is a further object of this invention to provide a large-capacity mass memory in which large amounts of binary information can be stored in a relatively small volume and in which the cost per bit storage capacity is relatively small.

It is a still further object of this invention to provide a high speed memory system utilizing the principle of shifting series of magnetic domains along a magnetic medium, which allows simplified and reliable bidirectional reading and recording.

It is another object of this invention to provide an improved data storage system utilizing the principle of shifting magnetic domains, that provides both improved and simplified addressing and reading of large amounts of binary data and rapid addressing and reading of specific binary information such as words or blocks of words included in the stored data.

The memory system in accordance with the principles of the invention stores information serially as magnetic domains of variable length along elongated magnetic mediums. The domains representing binary information are moved through the magnetic mediums by magnetic fields which may be generated by passing quadrature related current pulses through conductor arrays coupled to the mediums. The system is organized with a plurality of storage banks each including a serial channel or magnetic medium for each bit position of a word to be handled. The serial channels of each bank are controlled by a single polyphase propagation array so that the bits representing corresponding words are propagated along the magnetic mediums in parallel. An input-output system is provided with read-write conductors connected in common for corresponding channels in each bank storing information of similar binary significance. An addressing system selects a bank of channels to be energized by propagating fields to propagate the serial information in a selected direction along the mediums. An arrangement which may include an additional channel is provided in each bank for storing the word addresses and during an addressing operation the direction of propagation is controlled for reading out the address or recording a new address therein. Thus, the system provides reading of randomly accessed words, reading of selectively addressed blocks of information, or reading of a mass of information without addressing the words or block of words. Similar access to the memory is provided for recording information therein.

The novel features of this invention, as well as the invention itself, both as to its organization and method of operation, will best be understood from the accompanying description taken in connection with the accompanying drawings, in which like characters refer to like parts, and in which.

Figure 1:
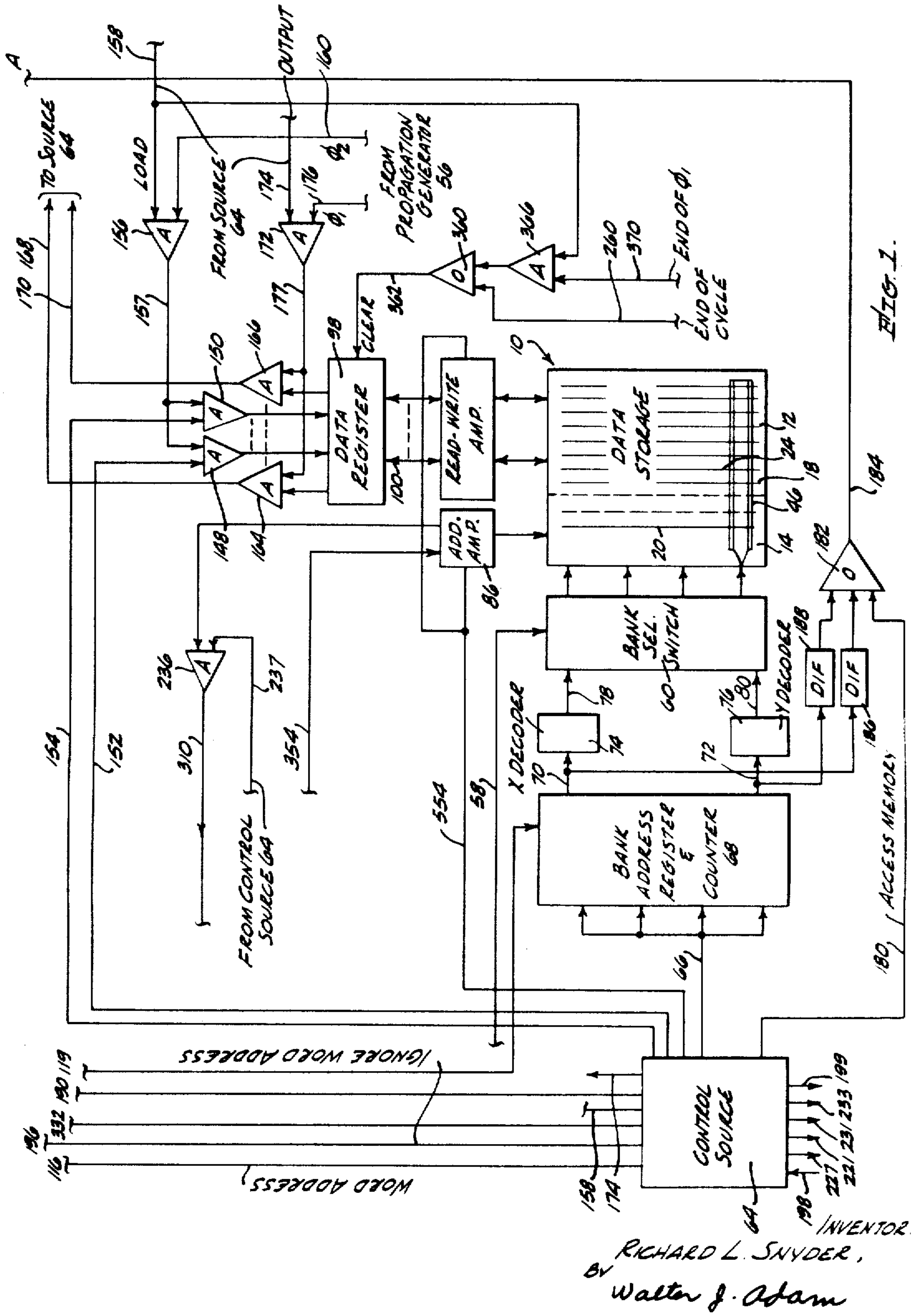
FIG. 1 is a schematic circuit and block diagram of a first portion of the memory system in accordance with the principle of the invention.
Figure 2:
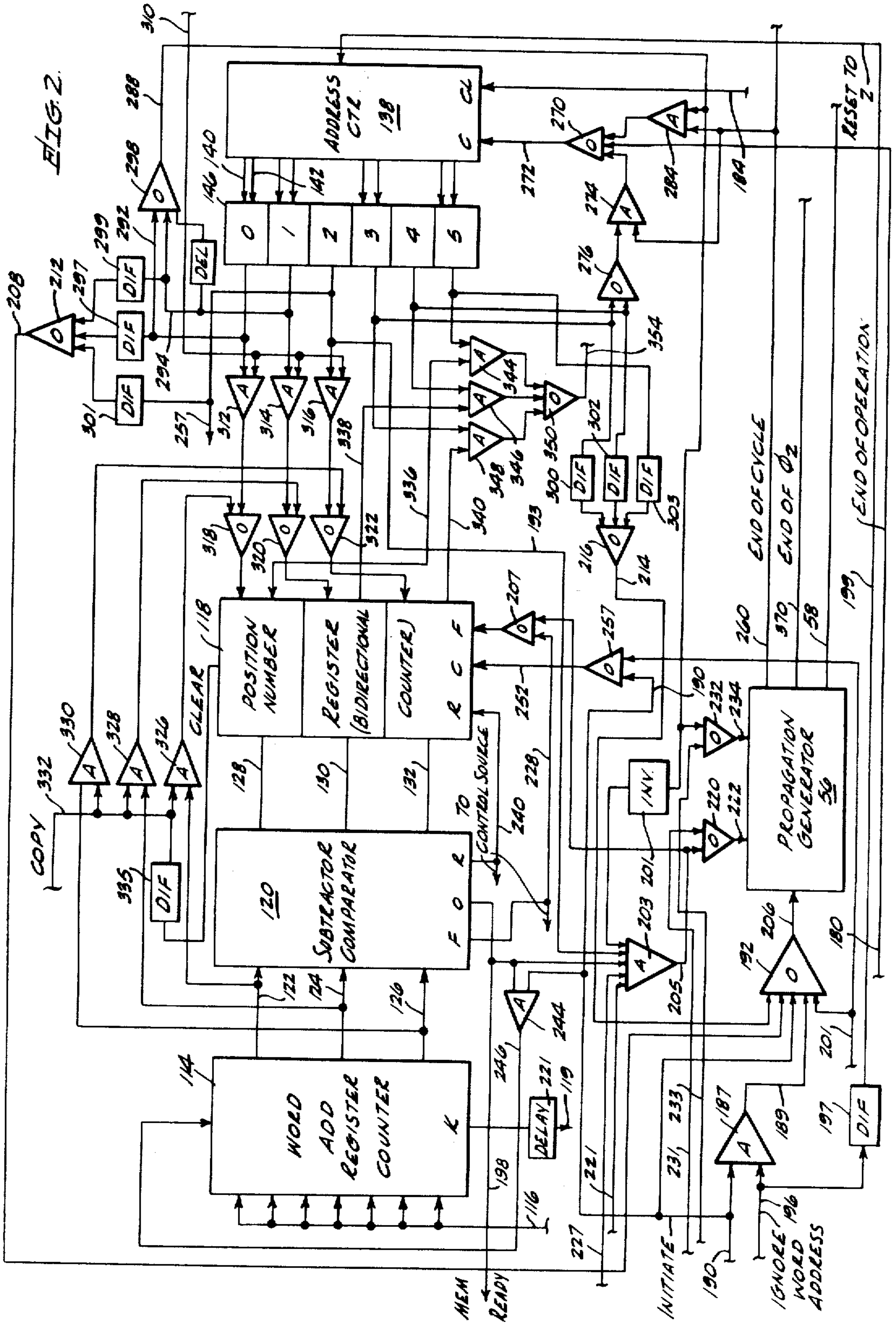
FIG. 2 is a schematic circuit and block diagram of a second portion of the memory system in accordance with the principle of the invention.
Figure 3:
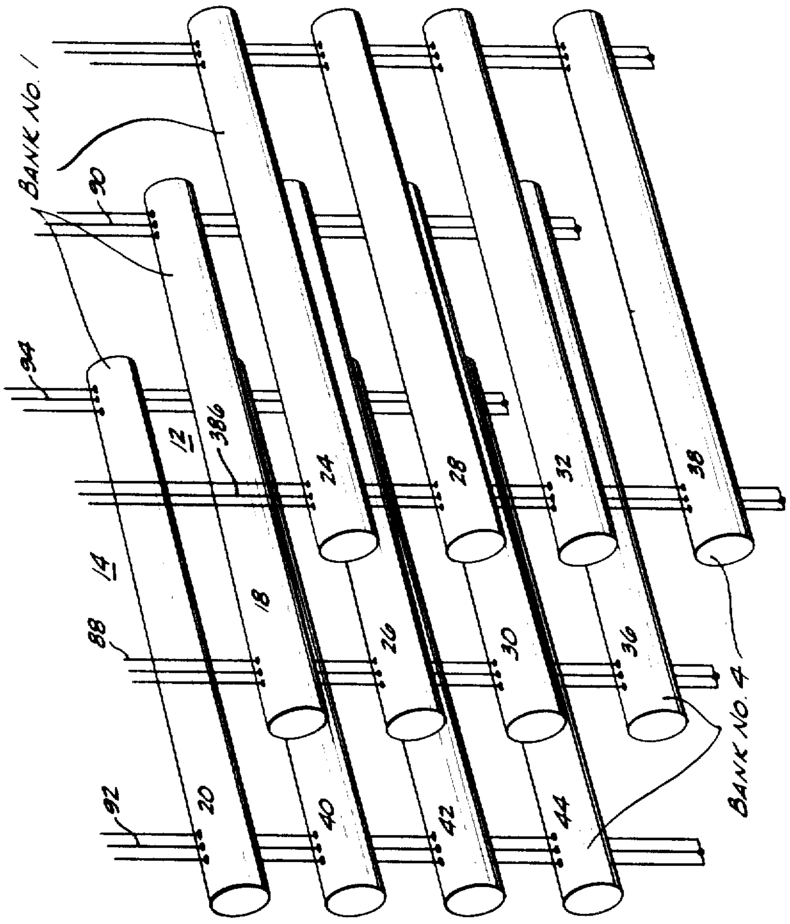
FIG. 3 is a schematic perspective diagram showing the arrangement of the memory elements or channels in word storage banks to form the memory array as utilized in the system of FIG. 1.

Referring first to FIGS. 1 and 2, the memory system in accordance with the invention includes a memory array 10 having a data storage portion 12 and an address storage portion 14. The data portion 12 includes N banks of M serial bit storage elements with each of the M serial elements having a length to store D binary bits. The M serial storage elements provide M bits in each word as they are recorded and interrogated in parallel. For purposes of example only, the system will be explained with 4 banks each including 8 memory elements such as the memory elements 18 and 20. Each bank stores 8 words, that is, each memory element stores 8 binary bits with the bits in different memory elements within a bank being of different orders of binary significance. As shown in FIG. 3, the data storage portion 12 includes in a first bank, the memory elements 18 and 24 and six other memory elements as indicated in FIG. 1 for the first bank. The second bank includes memory elements 26 and 28, the third bank includes memory elements 30 and 32 and the fourth bank includes memory elements 36 and 38. Each of the four banks include six additional memory elements which are not shown in FIG. 3 for convenience of illustration. It is to be noted at this time that the eight memory elements forming each bank are adjacent to common propagating arrays.

The address portion 14 includes a memory element 20 for the first bank, or in some arrangements in accordance with the invention, a plurality of memory elements for storing the word address of each corresponding data bank. As shown in FIG. 3, the memory elements 20, 40, 42 and 44 are associated with respective banks 1, 2, 3 and 4 and each serially stores the address of three binary bits for one of the eight words of the corresponding bank. Also, in accordance with the invention the memory word address may be stored in parallel in a plurality of storage elements in each bank to be recorded and read in parallel with data words from a selected bank.

Each bank of memory elements and the associated address element or address elements is controlled by a single propagating conductor array indicated as 46 in FIG. 1. As may be seen in FIG. 6, the propagating array 46 provides bidirectional propagation for all storage elements of the first bank which includes the address element 20 as well as the data elements such as 18 and 24. The second, third and fourth banks respectively include propagating conductor arrays 48, 50 and 52. Each propagating array such as 47 and 49 includes two conductors offset in position along the magnetic elements such as 20 and 18 so that magnetic domains are propagated therealong in response to quadrature related pulses applied to the conductors. The magnetic elements such as 18 may include a magnetic wire maintained under sufficient tension to be magnetically oriented along the longitudinal axis thereof so that magnetic domains are formed and propagate therealong or may include other storage mediums formed of suitable magnetic materials having similar properties such as magnetically oriented thin film.

Figure 6:
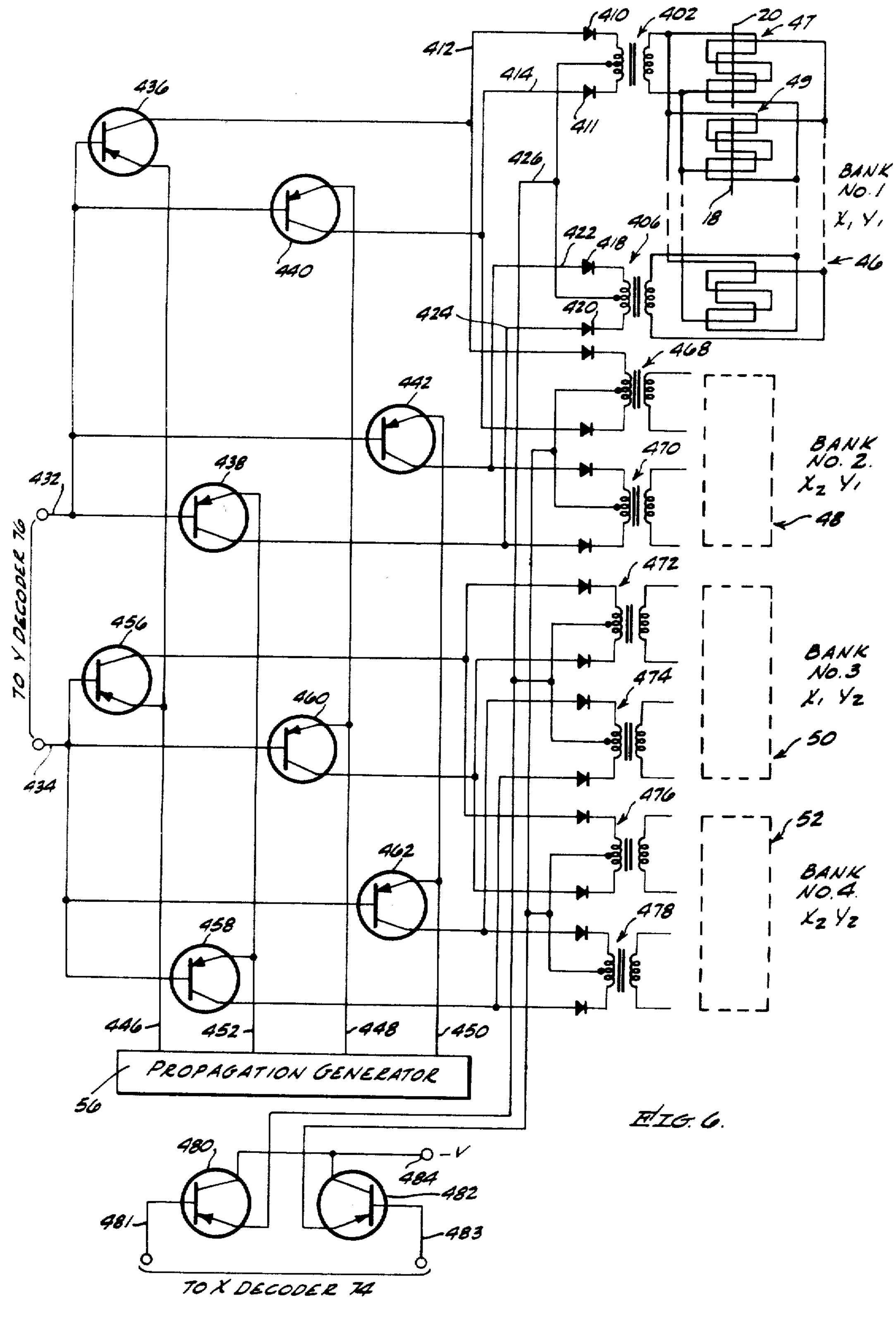
FIG. 6 is a schematic circuit and block diagram of the bank selection arrangement of FIG. 1.

The propagation system of FIGS. 1 and 2 includes a propagation generator 56 coupled through a composite lead 58 to a bank selector switch 60 which in turn applies polyphase propagating current pulses to a selected array 46, 48, 50 or 52 (FIG. 6). A storage bank is selected for reading and writing by a bank address applied from a control source 64, which may include the logical control circuits of a conventional computer, through a composite lead 66 to a bank address register and counter 68. A conventional binary counter operable to count in the forward direction may be utilized for the bank address register and counter 68. The binary states of the contents of the bank address register 68 are applied through respective composite leads 70 and 72 to respective X and Y coordinate decoding circuits 74 and 76 to define a particular bank in the X and Y coordinate directions. The decoded address signals apply pulses through selected leads of each of composite leads 78 and 80 to control the bank selection switch 60 and direct the propagating quadrature pulses from the propagation generator 56 to the selected propagation array such as 46.

As will be explained in further detail subsequently, the binary information is stored along the magnetic wire of the elements such as 18 alternately as informational domains and as reference domains. A reference domain may be of a polarity represented by an arrow pointing to the left in FIG. 7, a "zero" may be represented by the same polarity as a reference domain and a "one" may be represented by a domain of opposite polarity shown as an arrow pointing to the right. A magnetic domain wall is provided at the joining of two adjacent like magnetic poles, that is, at both ends of a "one" domain which are adjacent to a reference domain, while a "zero" domain is a continuation of the adjacent reference domains so that domain walls are not formed thereat. Thus, by alternately recording a reference domain and an informational domain, a "one" may be sensed by the presence of a domain wall moving past a sense coil and a "zero" may be sensed as the absence of a domain wall. In the illustrated arrangement in accordance with the principles of the invention, the binary bits of each word are recorded or read in parallel. To minimize the address elements, the address is stored in series in the associated single address element for each bank. As the illustrated system includes 8 binary bits in each word element or provides for storage of 8 words in each bank, 3 binary bits define the address number. When addressing a word in a bank, the three bits of stored address data at a predetermined position of the storage wire are read out by propagating the stored information for three cycles in the reverse direction which then brings the addressed word into position for reading. It is to be noted that in accordance with the principles of the invention, an improved and continuous circulation loop operative in both directions of propagation is provided for recording information after reading. After the address of the word in the predetermined position is obtained and compared with the desired address, the memory information is propagated in a forward or reverse direction, whichever is the shortest path to the word having the desired address, at which time the addressed word excites the read coils. The information is then propagated in the forward direction for reading additional data therefrom. At the end of the operation for reading binary data from the selected bank, the address of the word most recently retrieved or a new address is written into the address element during three forward propagating cycles so that the address is always at the same position relative to the read coil after termination of reading or writing information into a selected bank. During each propagation cycle, a binary bit may be read from one end of the magnetic wire and either the same or a new binary bit may be recorded at the other end of the magnetic wire.

Binary information is recorded and read from the memory 10 by read and write amplifiers 84 associated with the data storage elements and a read and write amplifier 86 associated with the address storage elements. As may be seen in FIG. 3, the elements representing the corresponding bit positions of each bank as well as the address elements have common read-write conductors or coils such as 88 and 90 for the least significant bit position, for example. During propagation in the forward direction, the read-write conductor 90 is utilized for reading and the read-write conductor 88 is utilized for writing in the element 18 and during propagation in the reverse direction the conductor 88 is utilized for reading and the conductor 90 is utilized for writing. Other read-write conductors at the corresponding ends of the array are utilized in a similar manner. Each of the read-write conductors such as 88 and 90 are coupled to different read and write amplifiers 84. Also, the memory word address elements for all banks have common read and write conductors 92 and 94 which are coupled to read and write amplifier 86.

A data register 98 is coupled to the read and write amplifier circuits 84 through composite leads such as 100 which provide for informational signals to pass in opposite directions during reading and writing. Address information is applied to the address amplifier 86 from a position number register 118 during writing of information into a selected address bank and is applied from the address amplifier 86 to the position number register 118 during reading of an address.

For controlling the read-write operation, a word address register and counter 114 as may be seen in FIG. 2 which counts in the direction of increasing binary value, receives a word address from the control source 64 through a composite lead 116. For the illustrated system, the register 114 includes three flip flops each having a single output lead and interconnected in a conventional manner to provide a three stage counter. The position number register 118 is also provided with three flip flops for storing the interrogated address of the word at the first position in an addressed bank. The position number register 118 is also a bidirectional counter circuit as is well known in the art controllable to count in either the forward or reverse direction. A subtractor and comparator circuit 120 is coupled through leads 122, 124 and 126 to the word address register 114 and through leads 128, 130 and 132 to the position number register 118. The subtractor comparator 120 responds to the word address and the position address to determine direction of required propagation for propagating a bank of information from the initial position at which the position address is obtained to a position for reading the addressed word and determines when the word address and the position address are the same, that is, when the addressed word is in position for reading, that is, has been interrogated and stored in the data register 98.

An address position number counter 138 which counts only in the forward direction is provided to control the initial readout of the word address of an addressed bank and the subsequent recording of the address after reading a desired number of words from the bank or a plurality of banks. The position number counter which may include three flip flops applies signals representative of its binary state through leads such as 140 and 142 to a binary radix 6 converter or decoder 146 which controls the transfer of address information from the address read amplifier 86 to the position number register 118 as well as controls the transfer of the address in the position number register 118 to the address write amplifier 86. The decoding circuit 146 is a conventional logical arrangement which applies a positive signal, for example, to a single output lead at each numerical count of the address counter 138.

For further explaining the control elements of the system, the transfer of information into the data register 98 is controlled by a plurality of "and" gates such as 148 and 150, the system utilizing eight similar "and" gates when each word stored in the memory 10 is formed of eight binary bits. The binary input signals are applied from the computer control source 64 through leads such as 152 and 154 to the respective "and" gates 148 and 150 and in response to control signals applied through a lead 157 from an "and" gate 156. A computer load signal applied from the source 64 through a lead 158 and a phase two signal applied from the propagation generator 56 through a lead 160 energizes the "and" gate 156 for loading the data register 98 with new information at the proper time during each propagation cycle.

For transferring binary data out of the register 98, a plurality of "and" gates such as 164 and 166, which may be a total of eight "and" gates are coupled between the register 98 and respective output leads such as 168 and 170 for applying binary words to the computer source 64. The "and" gates such as 164 and 166 are controlled by a signal on a lead 177 developed by an "and" gate 172 responding to an output control signal applied from the computer control source 64 through a lead 174 and a phase one signal applied to a lead 176 from the propagation generator 56. A strobe pulse may be applied from the control system 64 through a lead 554 to the read-write amplifiers 84 and 86. Also, write timing pulses (FIG. 8) may be applied to the read-write amplifiers through leads that are not shown for convenience of illustration.

For initiating the addressing operation of a selected bank of the memory 10, an access memory pulse is applied from the control source 64 through a lead 180 to an "or" gate 182 which in turn is coupled to a lead 184 for applying a clear pulse to the address counter 118. Also, for clearing the address counter 118 when the address in the bank register 68 changes during reading from a series of banks, the leads 70 and 72 are coupled through respective differentiating circuits 186 and 188 to the "or" gate 182. The access memory pulse may be provided at substantially the same time as the bank address signals applied to the address register 68.

The propagation generator 56 passes through one cycle or develops pulses in four sequential phase conditions in response to pulses developed by the counter 138 during reading and writing of an address or in response to an initiate pulse applied from the control source 64 through a lead 190 to an "or" gate 204. Initiate pulses are also applied from the control source 64 through a lead 199 to an "or" gate 204 when propagating the data from the initial address read from the address element to the selected word address. The "or" gate 204 is coupled through a lead 206 to the propagation generator 56 to initiate each propagation cycle. An ignore address signal is applied from the control source 64 through a lead 196 to an "and" gate 187 in combination with an initiate pulse on the lead 190 for reading a mass of data from a plurality of banks. The "and" gate 187 is coupled to the "or" gate 204 through a lead 189. The lead 196 is also coupled through a differentiating circuit 197 to a lead 199 which resets the address counter 138 to the third state when reading information from the memory substantially independent of the word address. A lead 208 is also coupled to the "or" gate 204 from an "or" gate 212 which responds to the first three counts of the position address counter 138 during reverse propagation for reading out of a word address from an addressed bank. A lead 214 is also coupled to the "or" gate 204 from an "or" gate 216 which responds to the fourth, fifth and sixth counts of the position number counter 138 when recording the word address after completion of reading words from a selected bank.

The propagation generator 56 is controlled for forward propagation in response to a signal applied from the control source 64 through an "or" gate 220 to a lead 222. During recirculation to a desired address, reading of data and writing of an address, an "and" gate 203 coupled to the "or" gate 220 through a lead 205 responds to a zero comparator signal on a lead 198 applied thereto from the comparator 120 and to a signal applied from the control source 64 through a lead 227 which is the inverse of the ignore address signal on the lead 196. A lead 221 also applies a signal from the control source 64 to prevent a signal from being applied through the "and" gate 203 during reverse propagation when recirculating the data until the comparator 120 develops a zero signal and that cycle is completed. The propagation generator 56 is controlled for reverse propagation by signals developed by an "or" gate 232 and applied thereto through a lead 234. A lead 233 is coupled from the control source 64 to the "or" gate 232 for maintaining reverse propagation during recirculation to a desired address. A lead 288 also responds to a signal developed by an "or" gate 290 during reading of an address. To apply a signal to the "or" gate 232 the signal on the lead 288 is applied to an inverting circuit 201 and to the "and" gate 203. Another input to the "and" gate 203 is the signal on the lead 193 representing the third state of the counter 138. The initiate pulse on the lead 190 is also applied through an "or" gate 257 and through a lead 252 to the position number register 118 for initiating counts thereof. Also, the initiate pulse on the lead 199 is applied to the "or" gate 257 for counting when recirculating the data to a desired address. The subtractor comparator 120 applies a forward signal to a lead 228 and both to the control source 64 and to an "and" gate 207 for controlling the counting direction of the position number counter 118. A reverse control signal is applied from the comparator 120 to a lead 240 and both to the control source 64 and to a reverse control terminal of the position number register and counter 118. The word address register 114 changes count during normal operation in response to a signal applied thereto from an "and" gate 244 through a lead 246. The "and" gate 244 is coupled to the "zero" comparison lead 198 which may indicate that a word is being read, and to the lead 190 for changing count in response to the initiate pulse.

The elements controlling the address counter 138 and the position number register 118 will now be further described. The address number counter 138 counts in response to a signal applied thereto from an "or" gate 270 through a lead 272. An input signal is applied to the "or" gate 270 from an "and" gate 274 which in turn responds to an end of cycle signal from the lead 260 and to a signal received from an "or" gate 276. Signals are applied to the "or" gate 276 from respective leads 278 and 280 respectively indicating the fourth and fifth counts of the position number counter 138. An input signal is also applied to the "or" gate 270 from an "and" gate 284 which in turn is coupled to the lead 260 for responding to an end of cycle pulse and is coupled through the lead 288 to the "or" gate 290. An end of operation pulse which initiates recording of a current address in the memory is also applied to the "or" gate 270 from the control source 64 through a lead 180. For controlling the second and third counts of the address number counter 138 as well as providing propagation generator control signals, the "or" gate 290 is coupled through leads 292 and 294 to respective leads 296 and 298 of the converter 146 and is coupled through a delay line 295 to the lead 298. The "or" gate 212 is controlled by signals applied from the leads 292, 294 and 255 through respective differentiating circuits 297, 299 and 301. The leads 278 and 280 and a lead 349 are also coupled through respective differentiating circuits 300, 302 and 303 for providing signals to the "or" gate 216. The lead 255 receiving signals upon the third count of the position number counter 138 is coupled to the lead 193 for controlling the propagation generator during a normal reading and writing operation.

For transferring the three bits of a word address from the address amplifier 86 to the position number register 118, the lead 310 is coupled from the address amplifier 86 to "and" gates 312, 314 and 316, each controlled by signals on respective leads 296, 298 and 255. The "and" gates 312, 314 and 316 are respectively coupled to "or" gates 318, 320 and 322 which apply signals to the position number register 118. For copying an address into the position number register to be recorded in the address element of the memory 10, the "or" gates 318, 320 and 322 are also coupled to receive signals from respective "and" gates 326, 328 and 330 which in turn are respectively coupled to leads 122, 124 and 126. A copy address signal is applied from the control source 64 through a lead 332 to the "and" gates 326, 328 and 330. During a copy address operation, a differentiating circuit 335 is coupled between the lead 332 and the position number register 118 for initially clearing that register.

Binary signals are applied from the position number register 118 through leads 336, 338 and 340 to respective "and" gates 344, 346 and 348. The "and" gate 344 is controlled by a signal on the lead 349 received from the converter 146 representative of the sixth count of the position number counter 138. The "and" gates 346 and 348 are coupled to respective leads 280 and 278 to which position signals are applied representative of the fifth and fourth counts of the counter 138. Thus, the binary information is read from the register 118 in an order opposite from being recorded therein. An "or" gate 350 is coupled to the "and" gates 344, 346 and 348 to apply signals through a lead 354 to the address amplifier 86 for sequentially writing a three bit address into the selected adress element such as 20.

For clearing the data register 98 (FIG. 1), a clear signal is applied from an "or" gate 360 thereto through a lead 362. The "or" gate 360 responds to an end of cycle signal on the lead 260 or to a signal developed by an "and" gate 366. An end of phase one signal is applied from the propagation generator 56 through a lead 370 and is applied to the "and" gate 366 as well as a computer load signal from the lead 158.

Figures 4, 5:
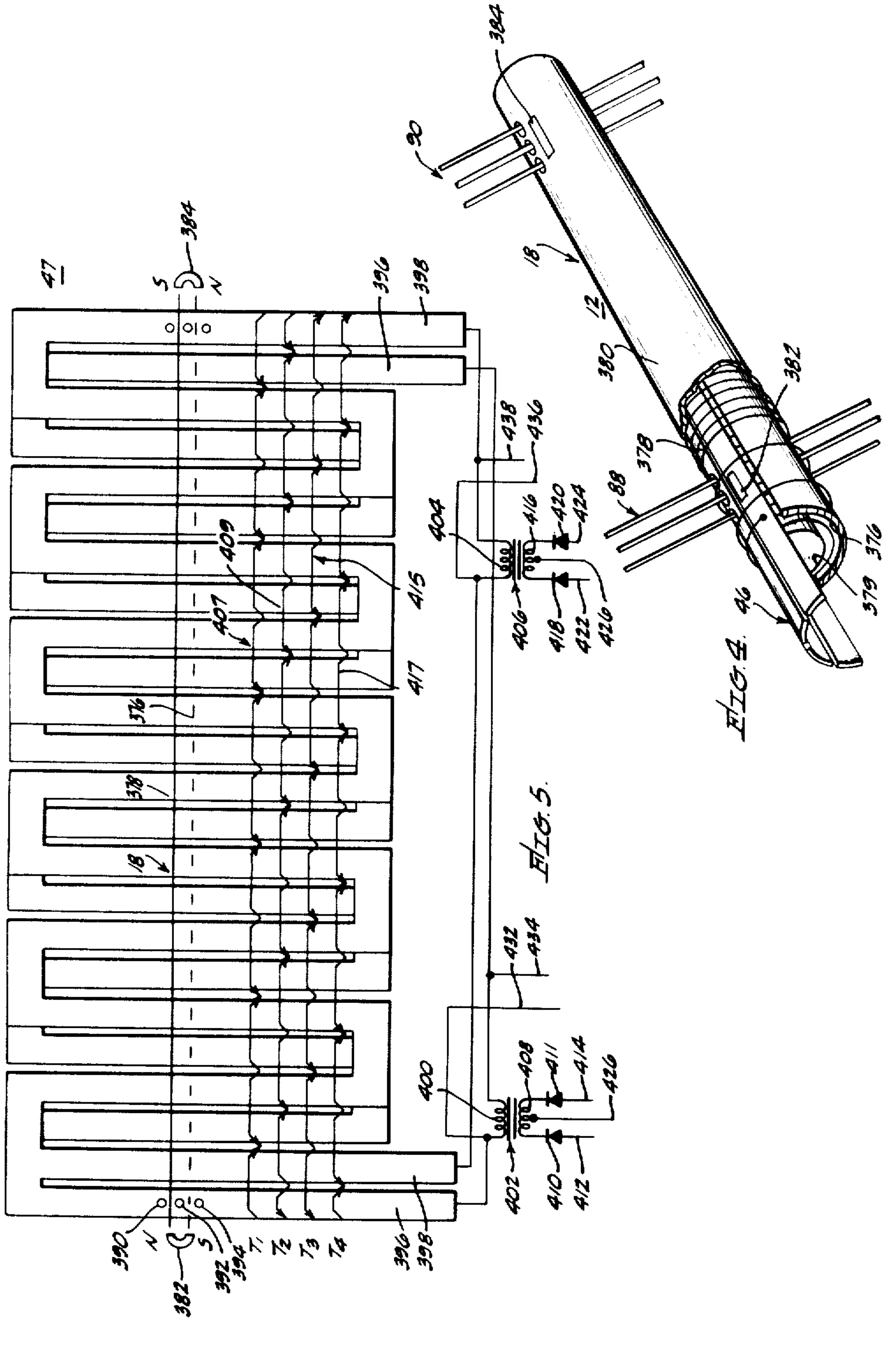
FIG. 4 is a schematic partially broken away perspective diagram of a memory element that may be utilized in the memory banks of FIG. 3.
FIG. 5 is a schematic diagram for explaining the arrangement of the propagating conductors in a single memory element in the storage banks of FIG. 3.

Referring now to FIGS. 3, 4 and 5, the memory system 10 will be explained in further detail. As previously discussed, the data portion 12 of the illustrated example, includes four banks each having eight memory elements such as 18 and 24 in bank number 1 and each having an address element such as the element 20 in bank number 1. The storage elements may be formed of magnetic mediums such as wire wound around cylindrical structures, oval structures or planar structures in accordance with the principles of the invention. For explaining a system utilizing an element having a cylindrical configuration, the data element 18 which is similar to each data and address element, will be explained. A magnetic medium or wire 376 may be wound on an inner metal cylinder 379 in a close pitch helix for storing information along the wire. Propagation conductors 47 are positioned on top of the wire 376 and a complementary magnetic wire 378 is wound around the propagation conductors. It is to be noted that either a complementary wire arrangement may be utilized with wires 376 and 378 or a single storage wire 378 may be utilized in accordance with the principles of the invention. At the read-write positions or at the read-write conductors 88 and 90, the pitch of the helix is lengthened for several turns to provide proximity to the read-write conductors. Thus the wires 376 and 378 in the long pitch portions are positioned relatively close to the conductors 88 and 90. The propagation conductors 47 which may be eight copper strips are maintained in position by being laminated to thin insulating films (not shown). The wires 376 and 378 extend for a few turns beyond the two read-write positions to provide for mechanical anchorage. As will be explained subsequently, the wires 376 and 378 may be maintained under axial tension to provide a longitudinal magnetic orientation therealong. A conducting sleeve 380 may be placed over the outer wire to provide magnetic shielding and mechanical protection. Magnets 382 and 384 are positioned over the long pitch winding portion adjacent to the read-write conductors for generating reference domains. The magnets 382 and 384 may be formed from ribbons of high coercivity magnetic materials such as Permandure, for example. Also, in accordance with the principles of the invention, DC (direct current) conductors may be utilized to provide fields at the positions of the magnets 382 and 384.

The read-write conductors 88 and 90 are common to all of the elements storing the least significant bit positions of each bank, passing through elements 18, 26, 30 and 36 (FIG. 3). For the next least significant bit position, the read-write conductor such as 386 passes through elements 24, 28, 32 and 34 and for the address elements the read-write conductors 92 and 94 pass through the elements 20 and 41 as well as through the elements (not shown) for banks three and four.

Figure 10:
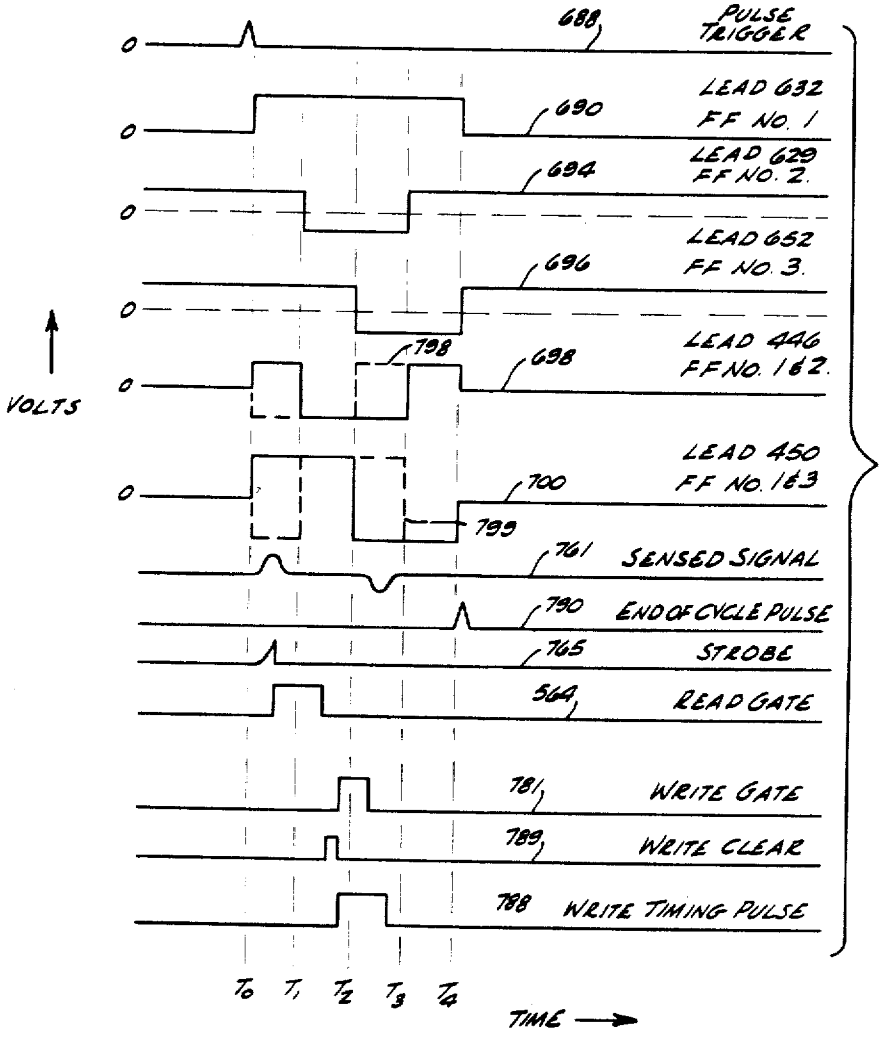
FIG. 10 is a schematic diagram of waveforms showing voltage as a function of time for further explaining the operation of the system of FIG. 1.

Referring now principally to FIG. 5, the conductor array 46 is shown flattened out in a schematic arrangement to effectively show the position of conductors 396 and 398 along the helical wound wires 376 and 378. The magnetic wire 376 is shown dotted below the propagating array 46 slightly offset from the wire 380 so that the read-write conductors can pass therebetween. Holes 390, 392 and 394 are formed in the center of a segment of the conductor array 46 for passing the read-write conductors 88 therethrough with similar holes at the other end of the array for the read-write conductors 90. The permanent magnets 382 and 384 are shown in positions at the ends of the wires 376 and 378. It is to be noted that the magnetic wires of other elements (not shown) of the bank 46 are also controlled by conductors similar to 396 and 398. Propagation conductors 396 and 398 are connected at each end of the element 18 of FIG. 4 so that current paths of the configuration shown in FIG. 5 are provided. Transformers are used to couple the propagation conductors to the selection circuits to enable the latter to operate in a push pull manner. It is also desirable to use transformers to accommodate the very low impedance of the parallel connected propagation conductors to the higher impedance of the selection circuits. First and second ends of the conductor 396 are coupled to respective first and second ends of a winding 400 of a transformer 402 and first and second ends of the conductor 398 are respectively coupled to opposite ends of a winding 404 of a transformer 406. A winding 408 of the transformer 402 has opposite ends coupled through the cathode and anode of respective diodes 410 and 411 to leads 412 and 414 for responding to propagating pulses and a winding 416 of the transformer 405 is coupled through the cathode and anode of the respective diodes 418 and 420 to respective leads 422 and 424. A lead 426 is coupled to center taps of respective windings 408 and 416 for providing selection of a bank in the X coordinate. All of the propagating conductors of each bank may be coupled in parallel as indicated by leads 432 and 434 coupled to the winding 400 and leads 436 and 438 coupled to the winding 404. Lines of propagation field arrows 407, 409, 415 and 417 indicate the propagation fields developed at respective times $T_1$, $T_2$, $T_3$ and $T_4$ in response to quadrature related propagating pulses as shown in FIG. 10.

Referring now to FIG. 6, the bank addressing and selection operation will be explained in further detail. Selection in the Y coordinate is provided by applying a negative pulse from the Y decoder 76 to leads 432 or 434 of the composite lead 80 (FIG. 1). Transistors 436, 438, 440 and 442 of the pnp types have bases coupled to the lead 432 and emitters coupled to respective leads 446, 452, 448 and 450 of the composite lead 58 (FIG. 1). Transistors 456, 458, 460 and 462 also of the pnp types have bases coupled to the lead 434 and emitters respectively coupled to leads 446, 452, 448 and 450. The collector of the transistor 436 is coupled to the lead 412 and the diode 410 at bank number 1 and to the diode at one end of the first transformer 402 at bank number 2. Transformers 468 and 470 are provided for bank number 2, transformers 472 and 474 are provided for bank number 3 and transformers 476 and 478 are provided for bank number 4. The collector of transistor 440 is coupled to the lead 414 and the diode 411 in bank number 1 and to a diode at the same end of the transformer 468 in bank number 2. The collector of the transistor 442 is coupled to the lead 422 and the diode 418 at the transformer 406 of bank number 1 and to the diode at the same end of the transformer 470 of bank number 2. The collector of the transistor 438 is coupled to the lead 424 and the diode 420 and to the diode at the same end of the transformer 470 in bank number 2. The collectors of the transistors 456, 458, 460 and 462 are coupled to the propagating conductors of banks number 3 and 4 in a similar manner through the transformers 472, 474, 476 and 478. The propagating arrays of the elements such as 20 and 18 in each bank such as bank number 1 are shown connected in parallel.

Selection of a bank in the X coordinate direction is provided by pnp type transistors 480 and 482 having collectors coupled to a suitable source of potential such as a V terminal 484. The emitter of the transistor 480 is coupled through the lead 422 to the center taps of the first windings of transformers 402, 406, 472 and 474 of banks 1 and 3 and the emitter of the transistor 482 is coupled to the center taps of the first winding of transformers 468, 470, 476 and 478 of banks 2 and 4. Each bank has eight data elements and one address element controlled by the associated propagating array. Thus, a bank is selected for propagating binary information along the associated magnetic wires by applying a negative pulse to a selected Y lead 432 or 434 and applying a negative pulse to a selected X lead 481 or 483 to bias the associated transformers so that polyphase signals are applied thereto from the leads 446, 448, 450 and 452. The bank selection system in accordance with the invention allows information to be read from or written into the memory independently of the word address as determined by the programmed control source 64 (FIG. 1).

Figure 7:
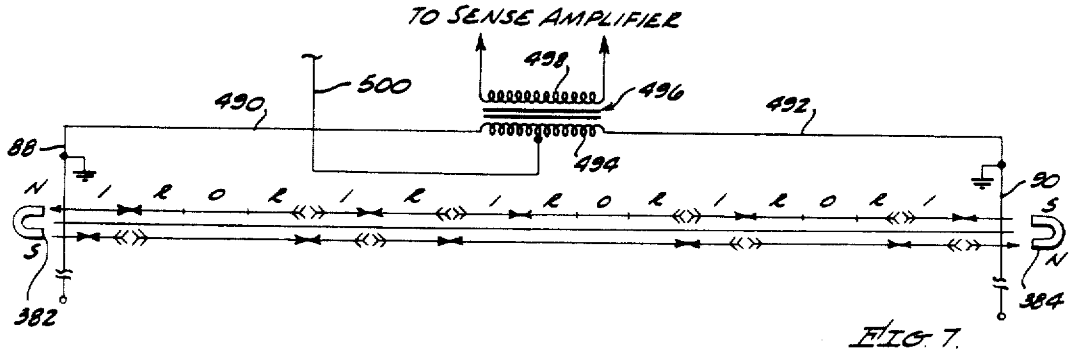
FIG. 7 is a schematic diagram of the reading and writing arrangement utilized for each binary bit position in the system of FIG. 1.
Figure 8:
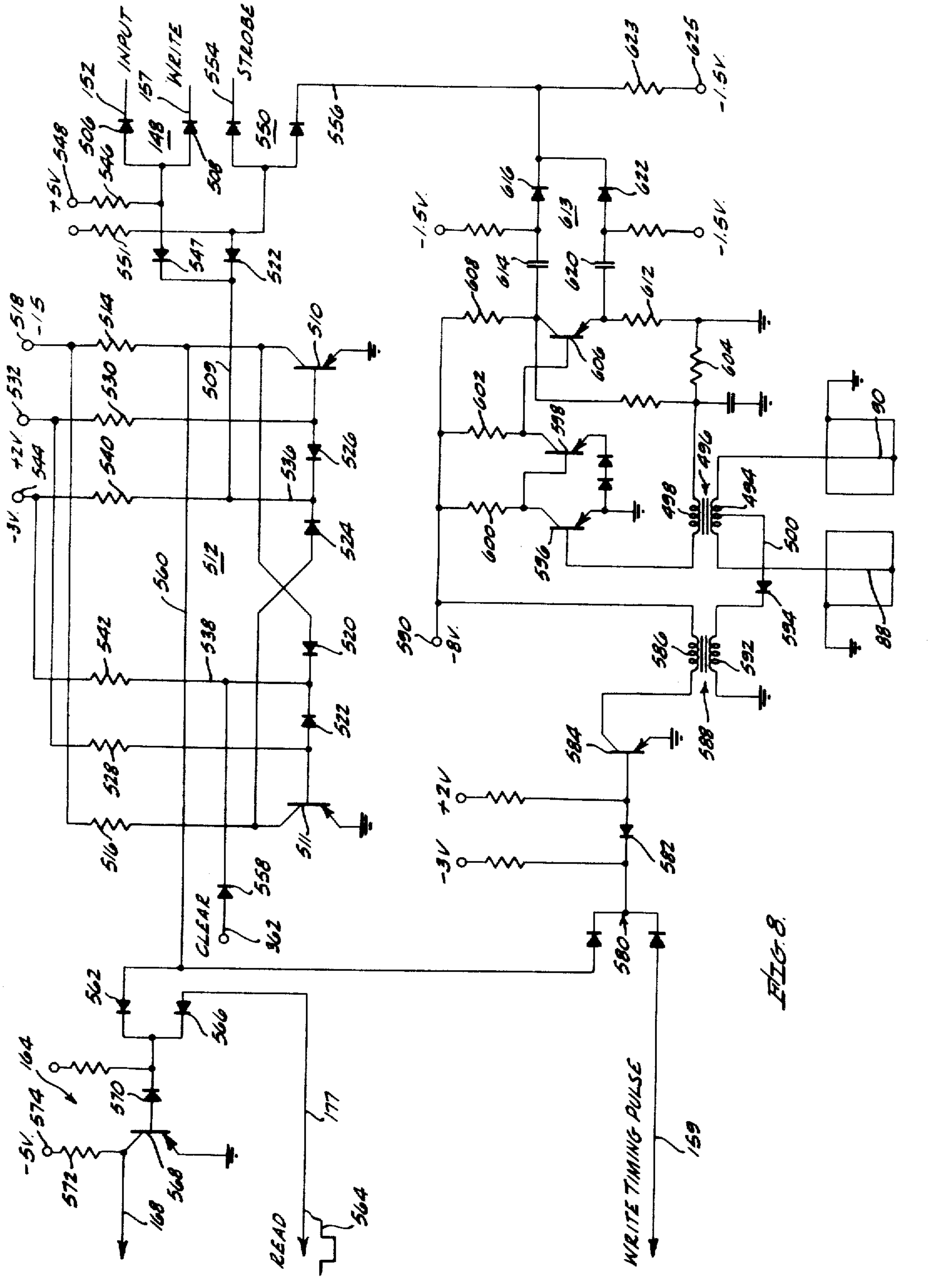
FIG. 8 is a schematic circuit diagram or a read-write amplifier and data register flip flop that may be utilized in the system of FIG. 1 in accordance with the invention.

Referring now to FIG. 7 as well as to FIG. 5, the reading and writing system functions at any bank in which propagating fields are moving the magnetic domains along the corresponding magnetic wires. The element 18 of bank number 1 is shown with the magnetic wires 376 and 378 as a single line for convenience of illustration. Read-write conductors 88 and 90 are shown broken to illustrate that the four elements of the same binary significance for each of the four banks are controlled by a common read-write system. Also, a common read-write system is utilized for the address elements in all four banks. Thus, the conductors 88 and 90 pass through holes such as 390, 392 and 394 at all four banks in the illustrated system. The two outer leads of the conductors 88 and 90 may be coupled to ground at upper ends and to respective leads 490 and 492 at the lower ends (FIG. 8) to form loops or coils magnetically coupled to the storage wires. The leads 490 and 492 are coupled to opposite ends of a winding 494 of a transformer 496 having a secondary winding which applies sensed signals to a sense amplifier (FIG. 8). Writing is performed by applying a negative signal to a lead 500 which is coupled to a center tap of the winding 494. The binary information is stored in the magnetic wire alternately as an informational bit domain of "0" or "1" and as a reference domain indicated as R. The element 18 is shown storing a binary 10110101 which may represent the least significant bits of eight binary words stored in bank number 1. It is to be noted that a domain wall which is the joining of two like magnetic poles occurs only when a reference domain is adjacent to a "one" domain, a "zero" domain being a continuation of the adjacent domain. When two magnetic wires 376 and 378 are utilized for each serial path in accordance with the principles of the invention, the domains in the first wire are of opposite magnetic polarity from the adjacent domains in the second wire so that a continuous magnetic path is provided at each domain position between the two wires. The complementary wire arrangement has the advantage that the magnetic lines of flux are substantially retained in the magnetic wires and the fields allow relatively close spacing of adjacent elements without affecting the magnetic states thereof.

The magnetic wires such as 376 and 378 may be magnetically oriented or have an anisotropy along the longitudinal axis thereof, that is, the magnetic dipoles or elements have a preferred direction of alignment along the longitudinal axis. The magnetic orientation may be provided by maintaining the wires under a stress condition such as axial tension, torsion or axial compression. The stress may in some arrangements be substantially near the yield point of the material, but the invention is not to be limited to any particular stress condition. For some magnetic materials such as thin films, longitudinal orientation for operation of the system in accordance with the invention is provided without a stress condition so that the principles of the invention are applicable to any magnetic material being sufficiently oriented or having sufficient anisotropy to provide domain propagation. An oriented magnetic medium has the property that substantially more magnetomotive force must be applied thereto to establish or nucleate a magnetic domain in the direction of orientation than is required to propagate in the direction of orientation an established domain wall or the joining of two like magnetic poles. The wires 376 and 378 may be of a nickel-iron material, for example.

For writing into the element 18 when the domains are being propagated to the right or in the forward direction, a negative pulse applied to the lead 500 establishes a "one" domain at the read-write coil 88 and the absence of a pulse on the lead 500 establishes either a "zero" or a reference domain because of the polarity of the domain forming permanent magnet 382. During forward propagation the domains moving past the conductor coil 90 or written at the coil 90 collapse at the permanent magnet 384. Similarly, when propagating the domains to the left or in the reverse propagation direction, writing is performed at the coil 90 with recorded bits and stored bits collapsing and changing to a reference polarity at the permanent magnet 382. For propagation of domains in the reverse direction, sensing of domain walls is performed at the read-write coil 88. The magnets 382 and 384 are of opposite polarity relaitve to the wires 376 and 378 because reference domains formed thereby are propagated in opposite directions.

During a reading period which may precede a writing period, the presence or absence of a domain wall passing by the coils 90 or 88 for respective forward and reverse propagation is sensed in the winding 498. Because the magnets 382 and 384 both form reference domains, a domain wall does not pass the coils 90 and 88 from either magnet to interfere with the reading at the opposite coil. A domain wall having a plurality of lines of flux passing into or out of the magnetic wire, induces a voltage in the coil 90 or 88 while a voltage is not induced when a portion of a domain without a domain wall thereat passes by the coil. It is to be noted that the magnetic elements or dipoles at a domain wall may have an alignment different than the longitudinal axis of the wire because of the lines of flux passing into and out of the wire thereat.

Referring now to FIG. 8, a typical read-write amplifier and data register flip flop is shown which may be utilized for the read and write amplifiers 84 and 86 and the data register 98 of FIG. 1. For writing into an element of a selected bank, the input gate 148 responds to a positive signal on a lead 152 and a positive computer load pulse on a lead 157 to bias diodes 506 and 508 out of conduction and apply a signal to a lead 509 which in turn biases a transistor 510 out of conduction and a transistor 511 into conduction representing a "one" state of a flip flop 512. The emitters of the transistors 510 and 511, which are of the pnp type, are coupled to a suitable source of reference potential such as ground, and the collectors are coupled through respective resistor 514 and 516 to a suitable source of potential such as a −1.5 volt terminal 518. The collector of the transistor 510 is also coupled through the anode to cathode path of a diode 520 and the cathode to anode path of a diode 522 to the base of the transistor 511. The collector of the transistor 511 is coupled through the anode to cathode path of a diode 524 and the cathode to anode path of a diode 526 to the base of the transistor 510. The bases of the transistors 510 and 511 are coupled through respective biasing resistors 530 and 528 to a suitable source of potential such as a +2 volt terminal 532. The cathodes of the diodes 526 and 520 are coupled to respective leads 536 and 538 which in turn are coupled through respective resistors 540 and 542 to a suitable source of potential such as a −3 volt terminal 544. The lead 509 is coupled to the lead 536 as well as through the cathode to anode path of a diode 547 and a resistor 546 to a suitable source of potential such as a +5 volt terminal 548. An "and" gate 550 is also coupled through a diode 552 to the lead 509 for responding to a strobe pulse on the lead 54 and a sensed input signal on a lead 556 (of the composite lead 100 in FIG. 1) for triggering the flip flop 512 to the "one" state. The "and" gate 550 includes a resistor 551 coupled to the terminal 548. In the absence of a pulse on the lead 556 the previously cleared flip flop 12 remains in the "zero" state. The flip flop 512 is cleared with the transistor 511 biased out of conduction in response to a positive clear pulse applied from the lead 362 through the anode to cathode of a diode 558 to the lead 538.

Stored binary information represented by a lower voltage level for a "one" and a higher level for a "zero" is applied from the collector of the transistor 510 through a lead 560 to a diode 562 of the "and" gate 164 which is energized in the presence of a negative read pulse of a waveform 564 applied from the lead 177 to a diode 566. The "and" gate 164 also includes a pnp type transistor 568 having an emitter coupled to ground, a base coupled through a diode 570 to a suitable source of biasing potential and to the diodes 562 and 566, and a collector coupled through a resistor 572 to a suitable source of potential such as a −5 volt terminal 574. The collector of the transistor 568 is coupled to the outpct lead 168 which may apply binary signals to a computer, for example.

Writing binary information into the element of a selected bank is controlled by an "and" gate 580 responding to the signal on the lead 560 and a write timing pulse on the lead 159 to bias a diode 582 into conduction and apply a potential to the base of a pnp type transistor 584 to bias that transistor into conduction. The emitter of the transistor 584 is coupled to a suitable source of reference potential such as ground and the collector is coupled through a winding 586 of a transformer 588 to a suitable source of potential such as a −8 volt terminal 590. A second winding 592 of the transformer 598 is coupled through the anode to cathode path of a diode 594 to the lead 500 for recording a binary "one" in the magnetic wire. For recording a binary "zero" a signal is not applied to the lead 500 and the permanent magnet forms the "zero" domain. The read amplifier includes pnp type transistors 596 and 598 with the transistor 596 having an emitter coupled to ground and the transistor 598 having an emitter coupled to ground through suitable biasing diodes. The collectors of the transistors 596 and 598 are coupled through respective resistors 600 and 602 to the negative terminal 590, the base of the transistor 598 is coupled to the collector of the transistor 596 and the base of the transistor 596 is coupled to one end of the winding 498. The other end of the winding 498 is coupled to ground through a suitable bypass capacitor in parallel with a suitable biasing resistor 604. The collector of the transistor 598 is coupled to the base of a pnp type transistor 606 of an additional amplifier stage having a collector coupled through a resistor 608 to the negative voltage terminal 590. The emitter of the transistor 606 is coupled through a resistor 612 to a suitable source of reference potential such as ground. To rectify signals sensed by a domain wall moving past the coil which has opposite polarities for propagation in opposite directions, a rectifier circuit 613 is provided with a capacitor 614 coupled between the collector of the transistor 606 and the anode of a suitably biased diode 616 and with a capacitor 620 coupled between the emitter of the transistor 606 and the anode of a suitably biased diode 622. The cathodes of the diodes 616 and 622 are coupled to the lead 556 for triggering the flip flop 512 to the "one" state at a strobe time. The lead 556 is also coupled through a resistor 623 to a suitable source of biasing potential such as a —1.5 volt terminal 625. It is to be noted that although the flip flop and the gating arrangement of FIG. 8 were explained relative to the data register of the memory 10, similar type elements may be utilized for other registers and counters utilized in the system of FIGS. 1 and 2. However, in accordance with the principles of the invention, the word address register 114 and the position number register 118 may utilize types of flip flops that are triggered to a selected state in response to a high or a low level pulse applied to a single input terminal as well known in the art. It is to be noted that athough information is generally shown herein as being transferred between two flip flops on a single conductor, two conductors may be utilized in accordance with the principles of the invention when types of flip flops are utilized having two input and two output terminals.

Figure 9:
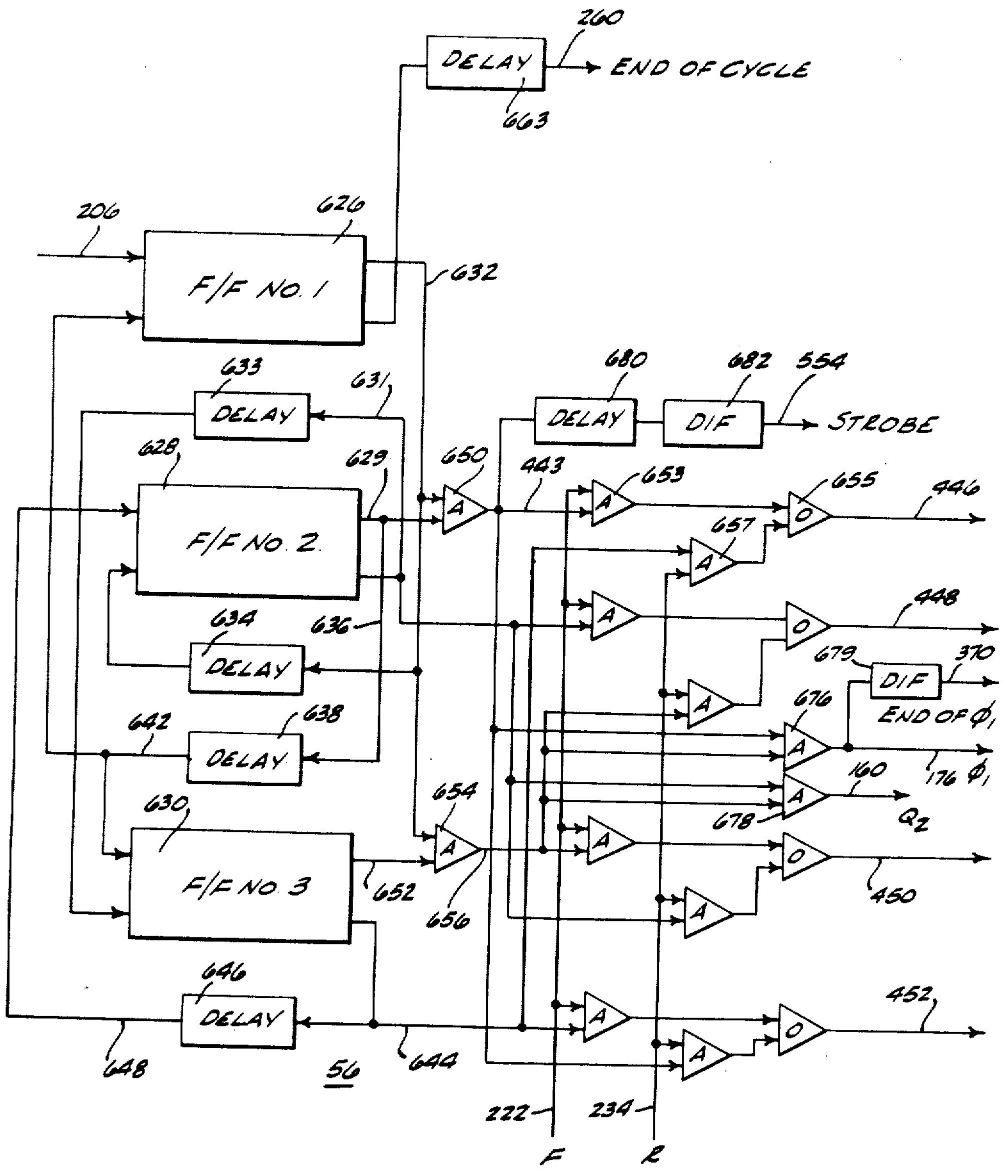
FIG. 9 is a schematic circuit and block diagram of a propagation generator that may be utilized in the system of FIG. 1 in accordance with the principles of the invention.

Referring now to FIG. 9, the propagation generator 56 includes flip flops 626, 628 and 630 with the flip flop 626 responding to an initiate pulse on the lead 206 to be triggered to the first or "one" state, for example. The flip flops 626, 628 and 630 may be of the type having separate input terminals for being triggered to opposite states and having two output terminals with a high level pulse applied to only one output terminal at each of the two binary states. The signal developed by the flip flop 626 is applied through a lead 632 to a delay line 634 for triggering the flip flop 628 to a second state after a quarter cycle delay period. When the flip flop 628 is triggered to the second state, a signal is applied to a lead 631 and to a delay line 633 for triggering the flip flop 630 to the second state after a quarter cycle delay period. A lead 644 is coupled through a delay line 646 and a lead 648 to the flip flop 628 for triggering that flip flop to the first state after a quarter cycle delay. A signal is thus applied through a lead 636 to a delay line 638 and an "and" gate 654. At the end of the fourth quarter cycle the flip flops 626 and 630 are reset by delayed signals applied to the lead 642. An "and" gate 650 is coupled to the lead 632 and the lead 629 for applying a positive signal to the leads 443 and 446 during first and fourth phases or quarter cycles. The lead 448 is coupled to the other output terminal of the flip flop 628 for developing a positive signal during the second and third phases of the cycle. The lead 632 and the lead 652 from the flip flop 630 are coupled to the "and" gate 654 for applying a signal to a lead 656 during first and second quarter cycles or phases. A positive signal is applied to the lead 644 during the third and fourth phases.

In order to control the direction of propagation, the propagating signals on the leads 446 and 448 and on the leads 450 and 452 are inverted and applied to opposite propagating conductors. The first four "and" gates such as 653 are coupled to the forward lead 222 to pass signals directly through four "or" gates such as 655 to respective leads 446, 448, 450 and 452. The "and" gate 653 is coupled to the lead 443, for example. Four "and" gates such as 657 are coupled to the reverse lead 234 and through the "or" gates to the respective leads 446, 448, 450 and 452 for providing the reverse direction propagation. The "and" gate 657 is coupled to the lead 644 and the "and" gate developing the signal on the lead 448 is coupled to the lead 656. The other two "and" gates which develop the reverse direction signals on the leads 450 and 452 are arranged in a similar manner. The end of cycle pulse on the lead 260 is formed by differentiating circuit 663 coupled to the second output terminal of the flip flop 626. The phase one pulse on the lead 176 is formed by an "and" gate 676 coupled to the leads 446 and 656 and the end of phase one pulse on the lead 370 is formed by a differentiating circuit 679 responding to the signal on the lead 176. The phase two pulse is applied to the lead 160 from an "and" gate 678. The strobe pulse is formed by a delay circuit 680 coupled to the lead 446 at one end and through a differentiating circuit 682 at the other end to the lead 554.

Referring now also to the waveforms of FIG. 10 for further explaining the operation of the propagation generator 56, an initiate pulse of a waveform 688 is applied to the lead 206 shortly before a time $T_0$ to trigger the flip flop 626 to the first state and apply a positive signal of a waveform 690 to the lead 632. After a one quarter cycle delay in the delay circuit 634 the flip flop 628 which normally applies a high level signal to the lead 629 is triggered to the second state to apply a negative pulse of the waveform 694 to that lead at time $T_1$. After a one quarter cycle delay in the delay circuit 633 or at time $T_2$, the flip flop 630 is triggered to a first state to apply a negative pulse of a waveform 696 to the lead 652. At the same time, a positive pulse is applied to the delay circuit 646 so that at time $T_3$ the flip flop 628 is triggered to the first state as shown by the waveform 694. When the flip flop 628 is triggered at time $T_3$, the delay line 638 is energized and the flip flops 626 and 630 are triggered at time $T_4$. The signals of the waveforms 690 and 694 applied to the "and" gate 650 develops a combined signal of a waveform 698 on the lead 443. The "and" gate 654 responds to the signals of the waveforms 690 and 696 to form the signal of a waveform 700. To invert the signals of the waveforms 698 and 700 as shown by the dotted waveforms 798 and 799, the signals on the leads 443 and 631 are gated to the respective leads 452 and 450 and the signals on the leads 656 and 644 are gated to respective leads 448 and 446. This inversion and applying the propagating pulses to alternate leads provides reverse direction propagation while maintaining a propagating field of the proper polarity at the write conductor such as 90 to combine with the write current when recording a "one." Because a "one" is recorded by combining the propagating field and the write field, the reference domains at the read-write conductors are not disturbed in unselected banks.

Figure 11:
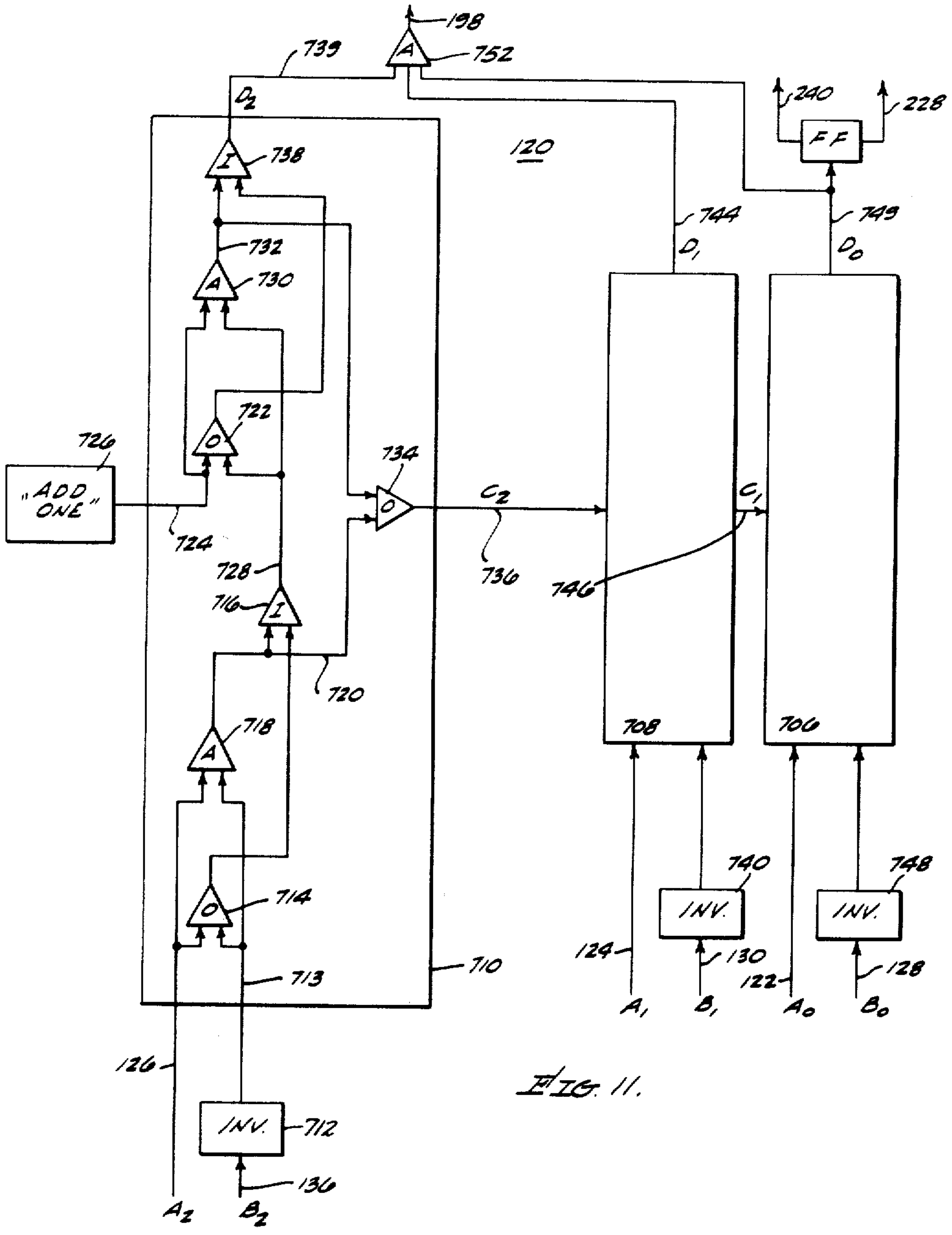
FIG. 11 is a schematic circuit diagram of a type of parallel adder that may be utilized for the subtractor and comparator of FIG. 1.

The subtractor comparator circuit 120 as shown in FIG. 11 responds to a word address in the word address register 114 and the position address in the position number register 118. The word address as well as the position number may be represented by three binary bits and be between decimal 0 and 7 for the illustrated system storing eight words in each bank. When the position number is read from the end position of an address element such as 20, it is compared with the word address to determine the required direction of propagation of the least number of propagation cycles to the addressed word. The subtractor comparator 120 also determines when the position number address is equal to the word address. The position number register 118 is a bidirectional counter that counts either forward or reverse, one count for each propagation cycle provided by the propagation generator 56 or for each initiate pulse applied to the register 118. When the most significant bit derived from subtracting the position number from the word address is "one" the propagation is determined to be in the forward direction and when the most significant bit is "zero" the propagation is determined to be in the reverse direction. This control of the propagation direction provides the shortest path of recirculation and the least time for an addressed word to be available for reading. For example, if the word address is 001 and the position number is 100, the difference after subtracting the position number from the word address number is 001 and the shortest propagation time to the addressed word is in the reverse direction. If the word address is 101 and the position number is 001 the difference is 100 and the propagation is in the forward direction. It is to be noted that the carry from the most significant digit is ignored during this subtraction operation.

The subtractor 120 of FIG. 11 which is illustrative of a type that may be utilized in accordance with the invention includes stages 706, 708 and 710 respectively of the most significant to least significant positions. As is well known in the art, subtraction is performed by inverting the subtrahend and adding the inverted number to the minuend with a carry added to the least significant position. The least significant stage 710 responds to the minuend $A_2$ (the word address) and the subtrahend $B_2$ (the position number) which is inverted in an inverter circuit 712 and applied through a lead 713 with the $A_2$ signal to an "or" gate 714, which in turn is coupled to an inhibit circuit 716. An inverter is included in the inhibit circuit 716 to provide a true output only if a first input is true and a second input is false. An "and" gate 718 is coupled to the leads 126 and 713 and applies a signal to a lead 720 and to the inhibt gate 716. An "or" gate 722 responds to a carry signal on a lead 724 developed by an add "one" circuit 726 and to a signal on a lead 728 developed by the inhibit gate 716. An "and" gate 730 responds to the carry signal on the lead 724 and to the difference signal on the lead 728 to apply a carry signal to a lead 732 and to an "or" gate 734. A second input signal is applied from the lead 720 to the "or" gate 734 which develops a carry signal $C_2$ on a lead 736. An inhibit gate 738 is coupled to the lead 732 and to the 'or" gate 722 to develop a difference signal $D_2$ on a lead 739. The stage 708 responds to the signal $A_1$, the signal $B_1$ after passing through an inverter 740 and to the carry signal $C_2$ on the lead 736 to develop a difference signal $D_1$ on a lead 744 and a carry signal $C_1$ on a lead 746. Similarly, the stage 706 responds to a signal $A_0$ from the word address register, a signal $B_0$ after passing through an inverter 748 and the carry signal $C_1$ on the lead 746 to develop a difference signal $D_0$ on a lead 749 representing the most significant bit of the remainder. A flip flop 750 may respond to the presence of a "zero" or a "one" on the lead 749 to apply a positive signal to either the lead 228 or to the lead 240 respectively controlling system forward or reverse propagation directions. For determining the "zero" state when the position number is the same as the word address, that is, the difference is zero, an "and" gate 752 is coupled to the leads 739, 744 and 749 to apply a "zero" control signal to the lead 198.

Figure 12:
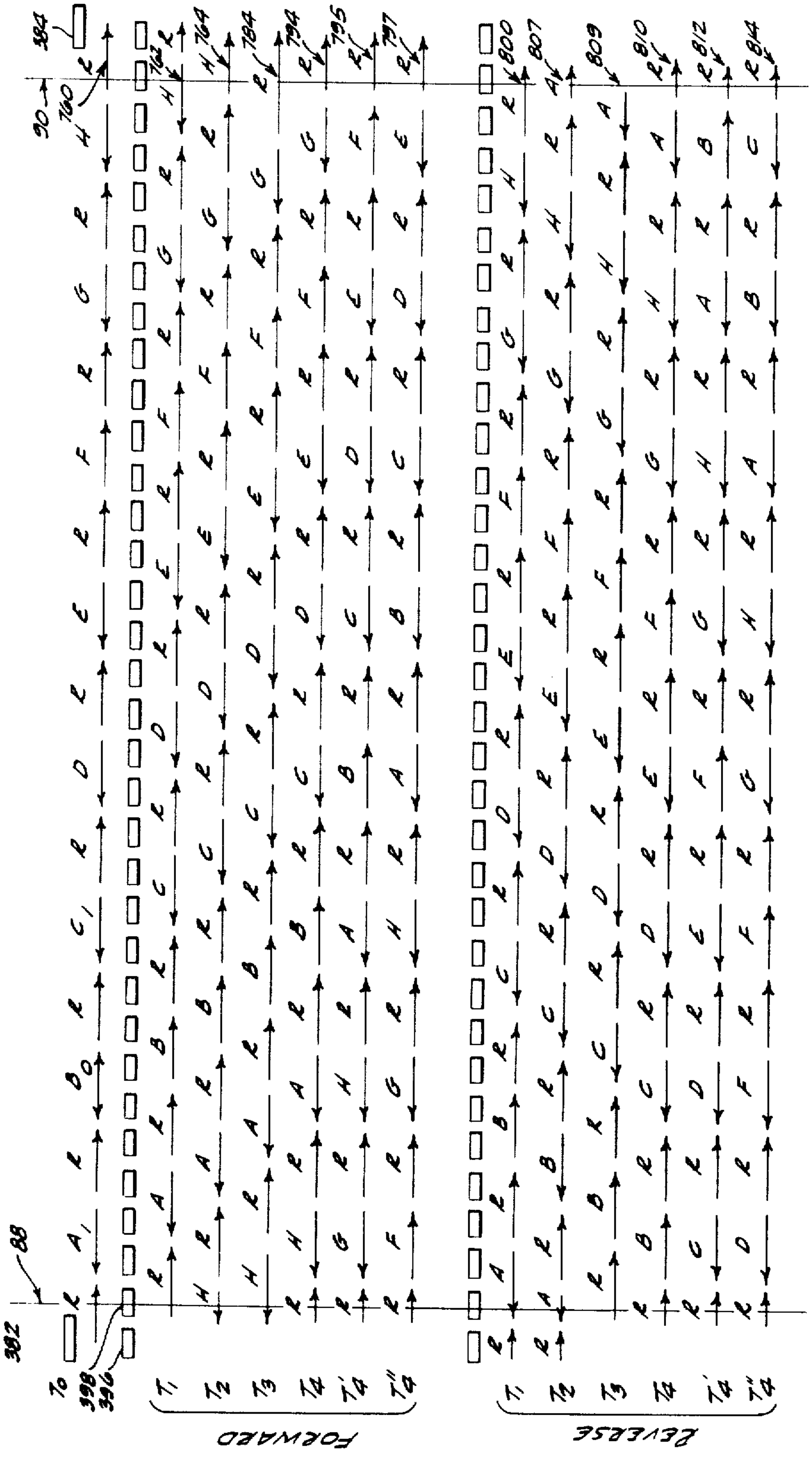
FIG. 12 is a schematic diagram showing the shifting and recirculation of magnetic informational and reference domains through a memory element in the system of FIG. 1 both during forward and reverse propagation.

Referring now to the schematic diagram of FIG. 12 as well as to the waveforms of FIG. 10, the forward and reverse reading, writing and recirculation of information will be explained in further detail. A series 760 of arrows show a storage condition in a data element at a time prior to time $T_0$ which is before the initiation of a propagation cycle. The series 760 is shown for a single magnetic storage wire such as 378 of FIG. 4 but it is to be understood that if a complementary wire such as 376 is utilized, the domains in that wire are similar but of opposite polarity to those shown. Also, each reference domain and each bit domain is shown as a separate magnetic domain arrow although it is to be understood that adjacent like domains combine into a single domain region along the magnetic wire. A domain wall is formed where two like magnetic poles, that is, two north poles or two south poles of adjacent domains join. Each of the information bits is designated A through H and represents a "zero" when of the same polarity as the reference domains R and represents a "one" when of an opposite polarity from the reference domains. All reference domains are of the same polarity as indicated by the arrows pointing to the right in FIG. 12.

At time $T_1$ during forward propagation which is at the end of the first quarter cycle, a series 762 of arrows shows that each of the domains has propagated one domain width forward to the right. Shortly after time $T_0$, the tail of the H domain arrow passes the position of the read-write coil 90 to induce a pulse of a waveform 761 therein representing a sensed "one." It is to be noted that if the H bit were of the opposite polarity representing a stored "zero," a pulse of the waveform 761 would not have been sensed shortly after time $T_0$, indicating the presence of a "zero." The data register flip flops such as 512 (FIG. 8) have been previously cleared in the preceding cycle. A strobe pulse of a waveform 765 is applied to the "and" gate 550 of FIG. 8 and a flip flop such as 512 is set to the "one" state. Thus, for forward propagation, the read-write coil 90 is utilized for reading. It is to be noted that a read gate pulse of a waveform 564 may be applied to the read gate 164 shortly after time $T_0$ for applying a signal indicative of the state of the flip flop 512 to the computer control source 64. It is to be recognized that a similar reading operation is performed in parallel in each data and address element of the selected bank.

At time $T_2$ the domains have been propagated one domain segment width forward as shown by the series 764. Shortly before time $T_2$, the write gate pulse of a waveform 781 is applied to the "and" gates such as 148 (FIG. 8) if new information is to be recorded during the domain propagation before and after time $T_2$. A write clear pulse is applied to the lead 362 (FIG. 8) shortly before the write gate pulse of the waveform 781 if new information is to be recorded. The contents of the data register flip flops are recorded in response to a write timing pulse of a waveform 788 applied to the "and" gate 580 shortly before time $T_2$. Thus, when propagation has been completed at time $T_3$ as shown by a series of arrows 784, the H bit has been recorded at the read-write coil 88 during two propagation quarter cycles. At time $T_3$, the recorded H bit has a width equal to two domain segments as shown by the series of arrows 784. At time $T_4$ as shown by a series of arrows 794, a small reference domain is established by the permanent magnet 382. An end of cycle pulse of a waveform 790 may clear the data register shortly after time $T_4$. Thus during each cycle of forward propagation, a binary bit is sensed by the read-write coil 90, recirculated and recorded by the read-write coil 88 or a new binary bit is recorded by the coil 88.

At a time $T_4'$ at the end of the next cycle as shown by a series of arrows 795, the G bit has been recirculated and recorded. Also, at time $T_4''$ after the end of the following propagation cycle, the F bit has been recirculated and recorded as shown by a series of arrows 797. Although this forward propagation has been explained relative to a data storage element, the operation is similar for an address element. At the end of reading words from a bank during a word address operation, the three bits of the address are recorded in the address element by forward propagation for three cycles. Thus, if the new address as obtained from the position number register 118 (FIG. 2) is represented by bits H, G and F, the information is sequentially applied to the address amplifier 86. At times $T_4$, $T_4'$ and $T_4''$ the bits H, G and F are recorded while normal recirculation of the data is performed. Thus, the word address is always recorded in the address element in the same position as shown by the left hand portion of the series of arrows 797 with the data word represented by the stored address being in the relative position of the H address bit of the series of arrows 797.

For reverse propagation, the propagation generator 56 of FIG. 9 is controlled so that the pulses of the waveforms 698 and 700 are inverted as shown by the dotted waveforms 798 and 799. Thus, the direction of change of the propagating fields at the four periods is opposite from that shown by the arrows 407, 409, 415 and 417 of FIG. 5 with the arrows being in the same position but of opposite polarity shortly before time $T_0$. At time $T_0$, the reverse propagation cycle is initiated in response to the trigger pulse of the waveform 688. The binary state of a data element of the addressed bank will be assumed to be that shown at time $T_0$ by the series of arrows 760. At time $T_1$, all domains are propagated one propagating conductor segment width to the left as shown by a series of arrows 800. As the head of the arrow representing bit A passes adjacent to the read-write coil 88, a "one" signal of the waveform 761 only of opposite polarity, is sensed and in response to the strobe pulse of the waveform 765, is stored in the data register flip flop such as 512. It is to be noted that if bit A were a "zero," the absence of a signal of the waveform 761 should indicate the sensed state, the data register having been previously cleared. Before time $T_2$ in response to the write clear pulse of the waveform 789 and the write timing pulse of the waveform 788, a bit A is recorded at the coil 90 as shown by the series of arrows 807. At time $T_3$, the domains have been propagated one segment to the left and in response to the write pulse of the waveform 788 the bit A is further recorded by the coil 90 as shown by a series of arrows 809. It is to be noted that a reference polarity is continually recorded by the read-write coil 90 for either a reference domain or a "zero" domain unless the coil 90 is energized to record a "one." Shortly after time $T_2$, the tail of the bit A passes adjacent to the coil 88 to form a negative pulse of the waveform 761 which is not utilized because of the absence of a strobe pulse.

At time $T_3$, the domains are propagated another segment width to the left to the condition at time $T_4$ as shown by a series of arrows 810 with the B bit at the predetermined position to be sensed during the next propagation cycle. At time $T_4'$, the B bit has been sensed as shown by a series of arrows 812 and recirculated and at time $T_4''$, the C bit has been sensed and recirculated as shown by a series of arrows 814.

During reading of an address from a selected bank, three reverse propagation cycles are performed to read the A, B and C bits, for example. When the last bit C is read from the element 20 at time $T_4''$, the words of the selected bank, three of which have been circulated during the propagation in the reverse direction, are in position of the bit C shown by the series of arrows 814. The next step is to recirculate the information to the word having the address in the word address register 114 (FIG. 2). Thus, the position of the last bit of the word address is the word defined by the stored address number.

At the end of the operation of reading a desired number of words from the selected bank, the address of the next word in the bank is recorded in the address element from the position number register 118. This recording is provided during three forward propagation cycles similar to recording H, G and F shown by the series of arrows 794, 795 and 797. All elements of the selected bank perform recirculation during the address recording operation. Thus, the three cycles of forward propagation for recording an address insures that the three reverse cycles for interrogating the address, properly positions the word defined by the recorded address, which word is read from the coil 88 at the cycle during which the last address bit is sensed.

Referring now principally to FIGS. 1 and 2, the operation of the system will be explained in further detail. The system operates in a normal address mode in which a bank is selected for applying propagating pulses thereto and an addressed word is selected in that bank with words being read therefrom until the operation is halted by an end of operation signal. The address at the end of reading is then recorded at the predetermined end positions in the bank at the position of the read-write conductor 88. This reading operation continues from one sequential bank to the next in response to a carry pulse developed by the word address register 114 and applied through the lead 119 to the bank address register and counter 68. When changing from one bank to the next in response to a carry signal, an address is not recorded by a special operation as 000 is provided in the address elements by the permanent magnet such as 382. Writing of binary information into the memory may be performed similar to this normal reading mode. In another mode of operation which is the ignore word address operation, only the bank address system is utilized and the data is read from an addressed bank without utilizing the word address control at each subsequent bank.

To first consider the word address operation, a bank is selected by a bank address applied from the computer control source to the bank address register 68 through the composite lead 66. Thus, as shown in FIG. 6, a Y lead such as $Y_1$ and an X lead such as $X_1$ are energized to select a bank of propagation conductors such as all of the parallel propagation conductors including conductors 396 and 398 of bank number 1. At the same time that the bank address is applied to the system, a word address is applied from the control source 64 through the composite lead 116 to the word address register 114. The system is thus ready to read the serial word address which is in the address element 20 adjacent to the read-write coil 88. In response to an access memory pulse on the lead 180, a signal is developed by the "or" gate 182 which is applied to the lead 184 to clear the address counter 138. Thus, a positive signal is applied to the lead 296 by the decorder 146. As a result, a signal is applied through the "or" gate 290 to the lead 288 and through the "or" gate 232 to the lead 234. The propagation generator 56 is thus set for reverse direction propagation as a result of the clearing of the address counter 138. As the pulse rises on the lead 296 a differentiated signal is developed by the circuit 297 and applied through the "or" gate 212 to the lead 208 and to the "or" gate 204. Thus, a trigger pulse is applied from the "or" gate 204 to the lead 206 and to the flip flop 626 (FIG. 9) to initiate the first reverse propagation cycle of the propagation generator 56. As a result, the first bit of the address is sensed shortly after time $T_0$ as indicated in FIG. 12 to be applied through the address amplifier 86 and the energized "and" gate 312 to be stored in the first flip flop of the position number register 118. The first flip flop of the position number register 118 is thus set to a state representative of the first bit of the address. It is to be noted that types of flip flops may be utilized in the register 118 that trigger to either state in response to an input signal or a clear signal (not shown) may be applied thereto substantially at the same time as the access memory pulse. The sensed bits are recirculated in the data storage elements of the addressed bank.

The end of cycle pulse of the waveform 790 of FIG. 10 is applied to the lead 260 from the propagation generator 56 shortly after time $T_4$ and to the "and" gate 284. Also, the positive signal on the lead 296 energizes the "or" gate 290 to apply a signal to the lead 288 to energize the "and" gate 284. As a result, the "or" gate 270 is energized to apply a count signal to the address number counter 138 which counts to 001 causing a positive signal to be applied to the lead 298 and a fall of the signal on the lead 296. The rise of the voltage on the lead 298 is differentiated by the differentiating circuit 299, applied to the "or" gate 212 and through the lead 208 to the "or" gate 204. Thus the propagation generator 56 is triggered into another cycle of reverse propagation as the "or" gates 290 and 232 remain energized to provide reverse direction control. The cycle then proceeds to store the second bit of the address in the second flip flop of the position number register 118 after being applied through the "and" gate 314. An end of cycle pulse is then applied to the lead 260 from the propagation generator 56 and to the "and" gate 284 in combination with a signal on the lead 288 so that a count pulse is applied from the "or " gate 270 to advance the address number counter 138. The delay circuit 295 maintains a positive signal on the lead 288 during the third cycle of operation so that the "or" gate 232 remains energized. It is to be noted that the signal on the lead 288 applied to the inverter 201 prevents the "and" gate 226 from being energized so that regardless of the state of the subtractor comparator 120, the reverse propagation is maintained.

A differentiated signal is applied from the differentiating circuit 301 through the "or" gate 212 and the lead 208 to initiate the third reverse cycle of the propagation generator 56. The voltage on the lead 288 terminates before the end of cycle pulse so that the "and" gate 284 does not pass a count signal through the "or" gate 270. Thus, the three binary bits of the address are transferred to the position number register 118. An "and" gate 236 is coupled on the lead 310 to respond to a control signal on a lead 237 so as to be closed during reading of the address and open during other operations to prevent information from the address element being applied to the "and" gate 316.

The comparator 120 thus determines whether the address in the registers 114 and 118 are equal or whether forward or reverse propagation is required, the determination being performed shortly after time $T_0$ (FIG. 10) when the binary state of the third bit is sensed and applied through the "and" gate 316. If the addresses are equal at this time, a zero signal is applied to the lead 198 and applied to the control source 64 as a memory ready signal. Because the zero signal is formed shortly after time $T_0$, the computer control 64 does not respond to a memory ready forward or reverse signal until the end of the cycle. The end of cycle signal may be utilized by the control source 64 as an indication of the completion of a cycle. Assuming that the counter 120 selects forward propagation, a signal is applied to the lead 228 and to the control source 64. The control source 64 responds to the third state signal on the lead 257 and to the end of cycle pulse to apply a forward control signal to the lead 231. Because the signal has fallen on the lead 288, the inverter 201 applies a signal to the "and" gate 203. Also, a signal is maintained on the lead 227 which is the inverse of the ignore address signal. Because the counter 138 is in the third state, a positive signal is maintained on the lead 193. The "and" gate 203 will thus respond to a "zero" signal on the lead 198 and a control signal on the lead 221. To provide the propagation, the computer which may respond to a signal on the lead 257 from the converter 146 and to the end of cycle pulse applies an initiate pulse to the lead 199 and to the "or" gate 257. It is to be noted that if a "zero" signal is applied to the lead 198 during the third cycle of reading the address, the control source 64 responds to a memory ready signal to apply a forward signal to the lead 231 and an initiate signal to the lead 190 at the end of that third reverse propagation cycle. In response to the initiate pulse on the lead 199, the counter 118 advances forward by one count, the "or" gate 257 being energized. Also, an initiate signal is applied through the "or" gate 204 to initiate a propagation cycle of the propagation generator 56. If the comparator 120 determines that the two addresses are equal, then a zero signal is applied to the lead 198 when the counter 118 changes count, which is applied to the control source 64 as a memory ready signal. Also, if another cycle of forward propagation is required, the forward signal is maintained on the lead 231 and in response to the next initiate pulse on the lead 199 the counter 118 again advances a count and the propagation generator passes through a cycle. A storage element (not shown) in the control system 64 responding to a signal on either the lead 228 or 240 applies a signal to either the lead 231 or 233 to maintain the selected direction of propagation, that is, forward direction in the example, during the last cycle of propagation. When a zero signal is applied to the lead 198, a memory ready signal is received by the control system 64. After the memory ready signal is received shortly after the time $T_0$, the data of the word which is in the data register 98 may either be utilized and recirculated or new information may be written into the memory by controlling the input and output gates at the data register 98.

In response to the zero signal on the lead 198 the control source 64 responds at the end of that cycle to apply a signal to the lead 221 and to the "and" gate 203 which in turn energizes the "or" gate 220 to maintain forward propagation of the generator 56 during subsequent reading of stored words. At the same time the control source 64 terminates the control signal on the lead 231 which has been maintained in response to the memory ready signal. For further reading of data words initiate pulses are applied to the lead 190 to advance both the counters 118 and 114 and to initiate each propagation cycle of the generator 56. Thus, as many words may be read from the system as initiate pulses are applied from the control source 64 to the lead 190. In response to each initiate pulse on the lead 190, a signal is applied to the "and" gate 244 to advance the word address counter 114 so that a "zero" signal is maintained on the lead 198. The counter 118 advances in the forward direction in response to initiate pulsese because the signal on the lead 205 is applied to the "or" gate 207. Between times $T_0$ and $T_4$ of each cycle, one word is read from all data elements of the propagated bank, recirculated and recorded at the other ends of the magnetic wire, that is, adjacent to the read-write coil 88, for example.

This operation continues in a similar manner in response to initiate pulses on the lead 190 with the counters advancing at each end of cycle. When the control source 64 determines that sufficient words have been read from that bank, an end of operation pulse is applied to the lead 180 after time $T_4$ and through the "or" gate 270 to advance the address number counter 138 by one count. As a result, the signal falls on the leads 255 and 193 and a positive signal is applied to the lead 278. Thus, a positive signal is applied to the "and" gate 348 and a signal representative of the state of the third flip flop is applied to the "or" gate 350. The signal on the lead 278 is also applied to the "or" gate 276 to apply a signal to the "and" gate 274, that gate to respond to end of cycle pulses. Because the comparator 120 is maintained in the "zero" state, the "and" gate 203 remains energized so that the propagation generator 56 is controlled for propagation in the forward direction. At the same time, the change of voltage level on the lead 278 is applied to the differentiating circuit 300 and through the "or" gate 216 to the lead 214 and through the "or" gate 204 to initiate a forward cycle. It is to be noted that the initiate pulses are not applied to the lead 190 from the control source 64. The third bit of the position address which is sampled in the register 118 is applied to the address amplifier 86 from the lead 354 to be recorded during that cycle in response to the write timing pulse of the waveform 788 (FIG. 10). In response to the end of cycle pulse of the waveform 790 shortly after time $T_4$, the "and" gate 274 is energized to apply a signal through the "or" gate 270 to advance the counter 138 to the fifth count indicated as the number 4 in the converter 146. Thus, the signal falls on the lead 278 and a positive signal is applied to the lead 280. The "and" gate 346 is thus energized and a signal representative of the second bit of the address is applied from the position number register through the "or" gate 350 and the lead 354 to the address amplifier 86. At the same time, a positive signal is also applied to the differentiating circuit 302 to apply a trigger signal through the respective "or" gates 216 and 204 to start the next propagation cycle of the propagation generator 56. A signal is also applied from the "or" gate 276 to the "and" gate 274. During this cycle the second bit is recorded in the address element 20 and all data is recirculated as discussed relative to FIG. 8.

In response to the end of cycle pulse of the waveform 790 (FIG. 10), a signal is applied through the "and" gate 274 and the "or" gate 270 to advance the address number counter 138 by one more count. A positive signal is thus applied to the lead 349 so that a signal representative of the binary state of the first flip flop of the register 118 is applied through the "or" gate 350 to the address amplifier 86. At the same time, a signal is applied to the differentiating circuit 303 to initiate the last forward cycle. Thus, the first bit is recorded in the address element 20 as one word of the data is recirculated. As the address counter 138 is not advanced in response to the end of cycle pulse, the lead 349 not being connected thereto, the address recording operation is completed. The reading and writing operation may be again repeated at a selected bank and a selected word address in response to the control source 64.

When writing new information into the addressed bank, a computer input pulse is applied to the "and" gate 156 and data is temporarily stored in the data register 98 in response to the phase two pulse on the lead 160. During this operation the data register 98 is cleared in response to an end of phase one pulse on the lead 370 energizing the "and" gate 366 and the "or" gate 360. Also, the data register 98 is always cleared in response to an end of cycle pulse.

After addressing a word in a selected bank such as bank number 1 and propagating the data to the addressed position, the control source 64 may determine to read data in sequence from several banks before developing an end of operation pulse. For this type of operation, a carry signal is developed by the counter 114 and applied to the lead 119 and the delay circuit 121 to advance the address of the bank address register and counter 68. Because the carry is developed shortly after time $T_0$ during a propagation cycle, the delay circuit 121 provides a delay so that the bank address counter 68 only advances after completion of the cycle. A differentiated signal is thus applied through the "or" gate 182 to clear the address counter 138. The above discussed operation of reading the address proceeds in each bank by obtaining the address of the first word. For this type of operation in the absence of an end of operation pulse, the address is not written into each subsequent bank by the control of the counter 138 because the 000 address is provided by the permanent magnets. This operation continues until an end of operation pulse is applied to the lead 180. If the control source 64 develops an end of operation pulse in any bank, the address is then recorded. It is to be noted that in the first addressed bank, the counter 114 develops a carry signal when changing to 000 so that the data is only read from that bank from the word at the selected address to address number 7. Thus during read out in a first bank such as bank number 1, a carry overflow signal is applied to the lead 119 from the address register and counter 114 after the last word of the largest address has been read from that bank to advance the bank address register and counter by one count. This operation continues until an end of operation pulse is applied to the system.

In another mode of operation, a large mass of data may be read from the banks in sequence without considering the word address. An ignore word address pulse is applied to the lead 196, to the "and" gate 187 and to the differentiating circuit 197. A differentiated signal is applied to the lead 199 to set the counter to the third count so that the converter 146 is in the 2 state. The inverse of the ignore address pulse is not applied to the lead 227 so that the "and" gate 203 remains deenergized. To select and maintain forward or reverse propagation a signal is applied from the control source 64 to one of the respective leads 231 or 233. Initiate pulses applied to the lead 190 pass through the "and" gate 187 and the "or" gate 204 to initiate each propagation cycle. A bank is thus read or information is written into that bank without being controlled by the word address. The states of the word address register and counter 114 do not affect the operation. A new address is applied from the control source 64 to the bank address register 68 for reading each subsequent bank of data. This operation continues until an end of operation pulse is applied from the control source 64 to record the address of the next word in the reading position. It is to be understood that this operation may also be utilized to record new word information in the banks from the data register 98.

For copying the address into each bank when changing the address of stored data or when loading the memory, a copy address pulse is applied from the control source 64 to the lead 332 to energize the "and" gates 326, 328 and 330 at time $T_0$ for example. The position number register 118 may be cleared in response to a differentiated signal developed by the differentiating circuit 335. The binary information in the word address register 114 is thus transferred to the position number register 118 and may be recorded in the address element such as 20 in response to an end of operation pulse.

During writing into the medium of a selected bank, the propagating fields and the writing fields combine and overcome the field developed by the permanent magnets to nucleate and form a "one" domain. In unselected banks the writing fields are not sufficient to nucleate a "one" state. The adjacent propagating conductor segments are arranged relative to the read and write conductors at both ends of the magnetic wires so that during the writing periods, the propagating fields and the writing fields combine in the selected bank for writing "ones."

In systems employing magnetic wires or mediums which have wide variations in coercivity, the use of combinatorial fields to prevent disturbance of the reference bits in the read-write positions of inactive or unselected banks may result in some reference domains being changed to "one" domains. If this type of magnetic medium is utilized, an initial set of signals may be impressed through the read-write coils when a bank is newly addressed to insure the existence of reference domains in the regions of the read-write conductors. Reverse current in the read-write conductors may be omitted if the reference magnets are near the read-write conductors as shown. It should be noted that all information bit positions will be undisturbed because first they have not been subjected to any fields while the bank has been inactive, and second the reestablishment of the propagation currents present when these bit positions were last propagated will not cause any change from a previous satisfactory condition. It is to be understood that in accordance with the invention, this arrangement for rewriting the referencewhen first selecting a bank is not required with suitable magnetic mediums.

Thus a memory system has been described in which separate addressing arrangements have been provided. The propagation or bank address system may be utilized to read large masses of data from the memory. The word address system utilized in combination with the bank address system allows selected words to be randomly accessed. The system operates at a relatively high speed and provides a reliable, low cost and relatively compact random access and mass storage arrangement.

What is claimed is:

1. A system comprising a memory array having a plurality of banks each including a plurality of magnetic elements with binary data stored along said elements as elongated magnetic regions in series, propagating means in each bank coupled to the corresponding magnetic elements, means coupled to said propagating means for accessing a selected bank, and means for reading said binary data at one end of the magnetic elements of the selected bank by advancing the magnetic regions and selectively writing the same or new data at the other ends of the magnetic elements of the selected bank.

2. A memory system comprising a memory array having a plurality of data storage banks each including a data storage portion and an address storage portion having an address representative of the address of the data in that bank, the data and address stored as movable magnetic informational domains along magnetic mediums, propagating means selectively coupled to the magnetic medium of each bank for moving the domains therealong, reading means coupled to said memory array for sensing the binary state of stored data and addresses moving along said mediums,
first addressing means coupled to said propagating means of said plurality of banks for selecting a bank so that the data therein is sequentially moved along said mediums and sensed,
and second addressing means coupled to said first addressing means and to said plurality of banks for selecting data of a predetermined address in a selected bank to be moved along said mediums and sensed by said reading means.

3. A combination comprising
a plurality of elongated magnetic mediums for alternately storing magnetic informational domains and reference domains therealong, said reference domains having a first polarity and said informational domains having a selected first or second polarity,
first and second conductor loops magnetically coupled to said mediums at respective first and second ends thereof,
controllable propagating means coupled to said plurality of magnetic mediums for applying propagating fields to a selected medium to propagate the magnetic informational and reference domains therealong in a selected direction,
domain forming means at each end of said mediums for forming reference domains,
control means coupled to said first and second loops for responding to the polarity of said informational domains,
storage means coupled to said control means,
and recording means coupled between said storage means and said control means.

4. A combination comprising
a plurality of elongated magnetic mediums for alternately storing magnetic informational domains and reference domains therealong, said reference domains having a first polarity and said informational domains having a selected first or second polarity,
first and second conductor loops magnetically coupled to said mediums at respective first and second ends thereof,
controllable propagating means coupled to said plurality of magnetic mediums for applying propagating fields to a selected medium to propagate the magnetic informational and reference domains therealong in a selected direction,
domain forming means at each end of said mediums for forming reference domains,
transformer means having first and second windings with the first winding coupled to said first and second coils,
storage means coupled to said second winding,
and recording means coupled between said storage means and a center tap of said first winding.

5. A memory system comprising
a plurality of storage banks each including a plurality of elongated magnetic mediums for storing magnetic informational domains therealong, selected ones of said mediums forming a data storage section and an address storage section,
a plurality of propagating arrays with each coupled to the magnetic mediums of a different one of said banks,
a source of propagating pulses coupled to said plurality of propagating arrays for applying propagating pulses to a selected array to propagate the domains along said mediums,
recording means and reading means coupled to said mediums for recording and reading magnetic domains in a bank selected by said source of propagating pulses,
and control means coupled to said recording means, to said reading means and to said source of propagating pulses for selecting domains at a predetermined address, reading data as a function of the predetermined address and recording an address at the termination of reading.

6. A system for reading and writing binary information comprising
an elongated magnetic medium for storing magnetic domain regions therealong alternately of a first polarity or of a selected first or second polarity representing binary states, adjacent domain regions of opposite polarity forming domain walls,
first and second conductors magnetically coupled to said mediums at first and second positions therealong to form a storage region therebetween,
first and second field forming means coupled to said medium adjacent to said first and second conductors at positions opposite from said storage region for forming domains of said first polarity,
propagating means magnetically coupled to said medium for propagating the domain walls in a selected first or second direction along said medium,
strobing means coupled to said first and second conductors for responding to a domain wall propagated in the first direction past said second conductor and to a domain wall propagated in the second direction past said first conductor,
storage means coupled to said strobing means,
and write control means coupled between said storage means and said first and second conductors for recording a binary state in the medium at the first conductor when propagating in the first direction and for recording a binary state in the medium at said second conductor when propagating in said second direction.

7. A combination comprising
a plurality of magnetic mediums for alternately establishing reference domains and informational domains therealong, said reference domains having a first polarity and said informational domains having a selected first or second polarity, a domain wall being formed at the joining of two domains of opposite polarities,
first and second conductors coupled to said plurality of magnetic mediums substantially at respective first and second ends thereof,
means for forming reference domains at both ends of said mediums at positions between the ends of said mediums and the corresponding conductors,
means for applying propagating fields to selected ones of said mediums for propagating the magnetic domains in a selected first or second direction therealong,
transformer means having first and second windings with the first winding coupled between said first and second conductors,
strobing means coupled to said second winding,
storage means coupled to said strobing means,
and timing means coupled between said storage means and a center tap of said first winding for recording informational domains in said mediums, whereby the medium responds to said propagating field in the first or second direction to move the domain respectively past the first or second conductor to sense the domain walls thereat with recording being performed at the other conductor.

8. A system comprising
a memory array having a plurality of banks each including a plurality of elongated magnetic wires for storing movable magnetic domains therealong, a first wire of each bank storing a word address and the other wires in each bank storing binary bits in series so that corresponding bits in said wires form binary words,
a plurality of propagation conductor arrays with each magnetically coupled to the wires of a different bank, a propagating pulse generator for developing propagation pulses to propagate the domain walls in a first or a second direction along said wires, bank selecting means coupled between said propagation pulse generator and said plurality of propagation arrays for applying propagation pulses to a selected array, control means having a plurality of conductors each one coupled to said wires of the same binary significance and to the address wires of said plurality of banks for reading word addresses and binary words therefrom, a control source coupled to said propagation pulse generator for initiating the operations thereof, a word address register, a position number register, a comparator circuit coupled between said word address register and said position number register, address counter means coupled to said control source, to said propagation generator, to said control means and to said position number register for sequentially gating address information thereto, address recording means coupled to said position number register, to said control means and to said address counter means for controlling the writing of an address, first gating means coupled to said comparator circuit, to said propagation generator, to said address counter means and to said control source for controlling the direction of propagation to read an address, read stored data and record an address, and second gating means coupled to said propagation generator, to said first gating means and to said control source for controlling said propagation generator to read word data from a selected bank independent of the word address.

9. A memory system comprising a plurality of banks each including a data section having a plurality of magnetic mediums each storing information of a different binary significance and an address section having a magnetic medium, each of said magnetic mediums having domain regions therealong alternately of a first polarity representing a reference region or of a selected first or second polarity representing an informational region, a plurality of propagating arrays with a different one magnetically coupled to the mediums of each bank for propagating the magnetic domain walls sequentially therealong, a propagation generator for developing propagating pulses to propagate said domain walls along said mediums in a selected forward or reverse direction, selection means coupled between said propagation generator and said plurality of propagation arrays for applying propagating pulses to a selected propagating array, a plurality of first conductors one magnetically coupled to the first ends of the mediums in said address sections and the others each magnetically coupled to the first ends of the mediums of the same binary significance in said plurality of banks, a plurality of second conductors one magnetically coupled to the second ends of the mediums in said address sections and the others each magnetically coupled to the second ends of mediums of the same binary significance in said plurality of banks, means coupled to said each of said mediums substantially adjacent to said first and second conductors for providing reference domains during propagation in the direction of the adjacent conductors, memory control means coupled between the corresponding first and second conductors for sensing domain walls moving past one conductor and recording domains in the other conductor, and address control means coupled to said memory control means for reading an address from the medium in the address section of a selected bank, for reading data from the data section of the selected bank and recording the current address in the address section at the termination of reading.

References Cited

UNITED STATES PATENTS

| | | | |
|---|---|---|---|
| 3,339,191 | 8/1967 | Weiss | 340—174 |
| 3,339,190 | 8/1967 | Kaufman | 340—174 |
| 3,328,778 | 6/1967 | Rosen et al. | 340—174 |
| 3,275,992 | 9/1966 | Neumann | 340—172.5 |
| 3,226,691 | 12/1965 | Hazard | 340—172.5 |
| 3,167,646 | 1/1965 | Giroux | 235—165 |
| 3,122,726 | 2/1964 | King et al. | 340—174.1 |
| 3,116,410 | 12/1963 | Manna et al. | 235—157 |
| 2,856,595 | 10/1958 | Selmer | 340—174 |
| 2,770,797 | 11/1956 | Hamilton et al. | 340—174 |

PAUL J. HENON, *Primary Examiner.*

GARETH D. SHAW, *Assistant Examiner.*